US006944766B2

(12) United States Patent
Hamada

(10) Patent No.: US 6,944,766 B2
(45) Date of Patent: Sep. 13, 2005

(54) INFORMATION PROCESSING APPARATUS

(75) Inventor: Masashi Hamada, Tokyo (JP)

(73) Assignee: Canon Kabushiki Kaisha, Tokyo (JP)

( * ) Notice: Subject to any disclaimer, the term of this patent is extended or adjusted under 35 U.S.C. 154(b) by 857 days.

(21) Appl. No.: 09/842,042

(22) Filed: Apr. 26, 2001

(65) Prior Publication Data

US 2002/0013905 A1 Jan. 31, 2002

(30) Foreign Application Priority Data

May 2, 2000 (JP) ....... 2000-133469
May 2, 2000 (JP) ....... 2000-133470
Feb. 7, 2001 (JP) ....... 2001-031246

(51) Int. Cl.[7] ....... H06F 1/24
(52) U.S. Cl. ....... 713/182; 713/193; 713/200; 713/201
(58) Field of Search ....... 713/182, 193, 713/200, 201

(56) References Cited

U.S. PATENT DOCUMENTS

| | | | | |
|---|---|---|---|---|
| 5,508,942 A | * | 4/1996 | Agarwal | 709/204 |
| 5,960,085 A | | 9/1999 | de la Huerga | |
| 5,983,273 A | | 11/1999 | White et al. | |
| 6,012,636 A | | 1/2000 | Smith | |

FOREIGN PATENT DOCUMENTS

| | | |
|---|---|---|
| EP | 0 633 519 A1 | 1/1995 |
| EP | 0 884 669 A2 | 12/1998 |
| EP | 0 884 669 A3 | 5/1999 |
| EP | 0 935 182 A1 | 8/1999 |
| JP | 6-60235 | 3/1994 |
| JP | 07-152837 | 6/1995 |
| JP | 9-114741 | 5/1997 |
| JP | 11-065938 | 3/1999 |
| JP | 2000-155715 | 6/2000 |
| JP | 2000-510986 | 8/2000 |
| JP | 2001-100982 | 4/2001 |
| WO | WO 97/29416 | 8/1997 |

OTHER PUBLICATIONS

Memon, et al., "Protecting Digital Media Content", Communications of the ACM, Jul. 1998, vol. 41, No. 7, pp. 35–43.

* cited by examiner

*Primary Examiner*—Thomas R. Peeso
(74) *Attorney, Agent, or Firm*—Fitzpatrick, Cella, Harper & Scinto

(57) ABSTRACT

An information terminal selects an input output device for user authentication in accordance with a user profile of a smart card and customizes a screen for the user authentication. In the smart card, information for selecting the input output device or customizing the screen is stored in a layer of a security level 0, and a key for accessing to an application such as electronic money, medical services, or the like is stored in a layer of a security level 1. The information terminal selects a menu screen for obtaining information from an information center in accordance with the user profile. The information terminal controls each of a plurality of objects constructing one scene in accordance with the user profile.

40 Claims, 25 Drawing Sheets

FIG. 11

```
     <UL>
     <LI>MENU FOR COMFORTABLE LIFE
                                  <!--......DISPLAY TITLE OF TOP INFORMATION MENU-->
     <UL>
1601~<LI><Not Carrier=employ>NATIONAL PENSION MENU</Not>
                                  <!--......DESIGNATE SCREEN WHEN USER IS NOT EMPLOYEE-->
     <UL>
1602~<Ul><Only Age=65over><A HREF="xx.html">NATIONAL PENSION ENTITLEMENT MENU</A><Only>
                                  <!--......DESIGNATE SCREEN WHEN USER IS MORE THAN 65 YEARS OLD-->
1603~<Ul><Only Carrier=Free or No><A HREF="xy.html">NATIONAL PENSION PAYMENT MENU</A><Only>
                                  <!--......DESIGNATE SCREEN WHEN USER IS FREELANCER OR A MAN OF REGULAR OCCUPANCY-->
1604~<Ul><Only Age=20over And Carrier=Student><A HREF="xz.html">TO STUDENT OF MORE THAN 20 YEARS OLD</A><Only>
                                  <!--......DESIGNATE SCREEN WHEN USER IS STUDENT OF MORE THAN 20 YEARS OLD-->
     </UL>
1605~<LI><Only Child=1 over>CHILDCARE MENU</Only>
                                  <!--......DESIGNATE SCREEN WHEN USER HAS CHILD-->
     <UL>
1606~<LI><Only Child Age=3 under><A HREF="yx.html">BABY'S MENU</A></Only>
                                  <!--......DESIGNATE SCREEN WHEN USER HAS CHILD OF LESS THAN 3 YEARS OLD-->
1607~<LI><Only Child Age=6 under 4 over><A HREF="yy.html">LITTLE CHILD'S MENU</A></Only>
                                  <!--......DESIGNATE SCREEN WHEN USER HAS CHILD OF 4-6 YEARS OLD-->
                                        :
```

EXAMPLE OF TOP MENU FOR AN USER WHO DOES NOT EXPECT USE OF USER PROFILE

INFORMATION PROCESSING APPARATUS

BACKGROUND OF THE INVENTION

1. Field of the Invention

The invention relates to an information processing apparatus.

2. Related Background Art

Hitherto, profiles of the users have been stored in a magnetic memory medium, an optical memory medium, etc. In the magnetic memory medium and optical memory medium, an individual file can be constructed in a layer manner. An information storage file exists in the individual file. Information can be stored in the information storage file.

Since an independent authentication key cannot be allocated to each individual file, however, the profiles of the users are protected by unitarily storing all of them and allocating the authentication keys thereto.

In a conventional information processing apparatus, however, when the memory medium in which the profiles of the users have been stored is loaded, profile information of the user in the memory medium cannot be read out before the user of the apparatus inputs authentication information (password or the like) necessary for performing an initial authentication process and succeeds in the initial authentication process.

Therefore, an initial user interface including input means of the authentication information for performing the initial authentication process has been predetermined on the apparatus side and cannot be matched with a preference of the user.

For example, there is a case where although the user demanded an audio input interface, he has to input data by a touch panel.

There is also a case where although a language used by the user is English, information is displayed in Japanese or an input in Japanese is required.

That is, hitherto, in case of transmitting and receiving information between the information processing apparatus and the memory medium of the user profile, before the initial authentication process is performed, a selection of a user interface corresponding to the user profile cannot be realized while maintaining a security level of the user profile.

In a conventional information contents delivery, in the case where there is information (violence scene or the like) which the viewer side does not want to see or the case where contents is constructed by a user level (payment fee level or the like) of the viewer, such a scene is replaced with a substitute scene.

In the above conventional apparatus, however, in the case where the information or the like which the viewer does not want to see exists in a part of the scene, since it is replaced with quite the different substitute scene, there is a problem that what kind of scene the inherent scene is cannot be recognized.

SUMMARY OF THE INVENTION

It is an object of the invention to reduce a load for performing a display suitable for the user.

Another object of the invention is to reduce a burden on user authentication.

Still another object of the invention is to assure a security according to the kind of information.

Further another object of the invention is to display one scene every plural objects in accordance with the user.

Further another object of the invention is to certainly protect information to which a security of a high level is required and, thereafter, make it possible to output or input the information by using a desired input output interface of the user.

Further another object of the invention is that a profile of the user which is required to be actively presented such as user interface, use language, or the like can be read out from a terminal apparatus side before succeeding in an initial authentication, the operation at a desired input output interface of the user can be performed, and a security of the user profile to which a security of a high level is required can be assured at a high level.

Further another object of the invention is to reduce a load for reconstructing an information selection menu.

Further another object of the invention is that in the case where information or the like which the user does not want to see exists in a part of a scene, contents other than such a part of scene can be recognized.

BRIEF DESCRIPTION OF THE DRAWINGS

FIG. 11 is a diagram showing an example of an HTML expanded coding of a top information menu in the third embodiment;

DETAILED DESCRIPTION OF THE PREFERRED EMBODIMENTS

An example in which a smart card (IC card) is used at a public information terminal which is used in the autonomy or the like is shown.

In the following embodiments, an example using an IC card is shown as an example of a memory medium in which an independent authentication key can be allocated to each individual file constructed in a layer manner. Another memory medium such as a portable terminal apparatus or the like can be used in place of the IC card.

Figure 1:
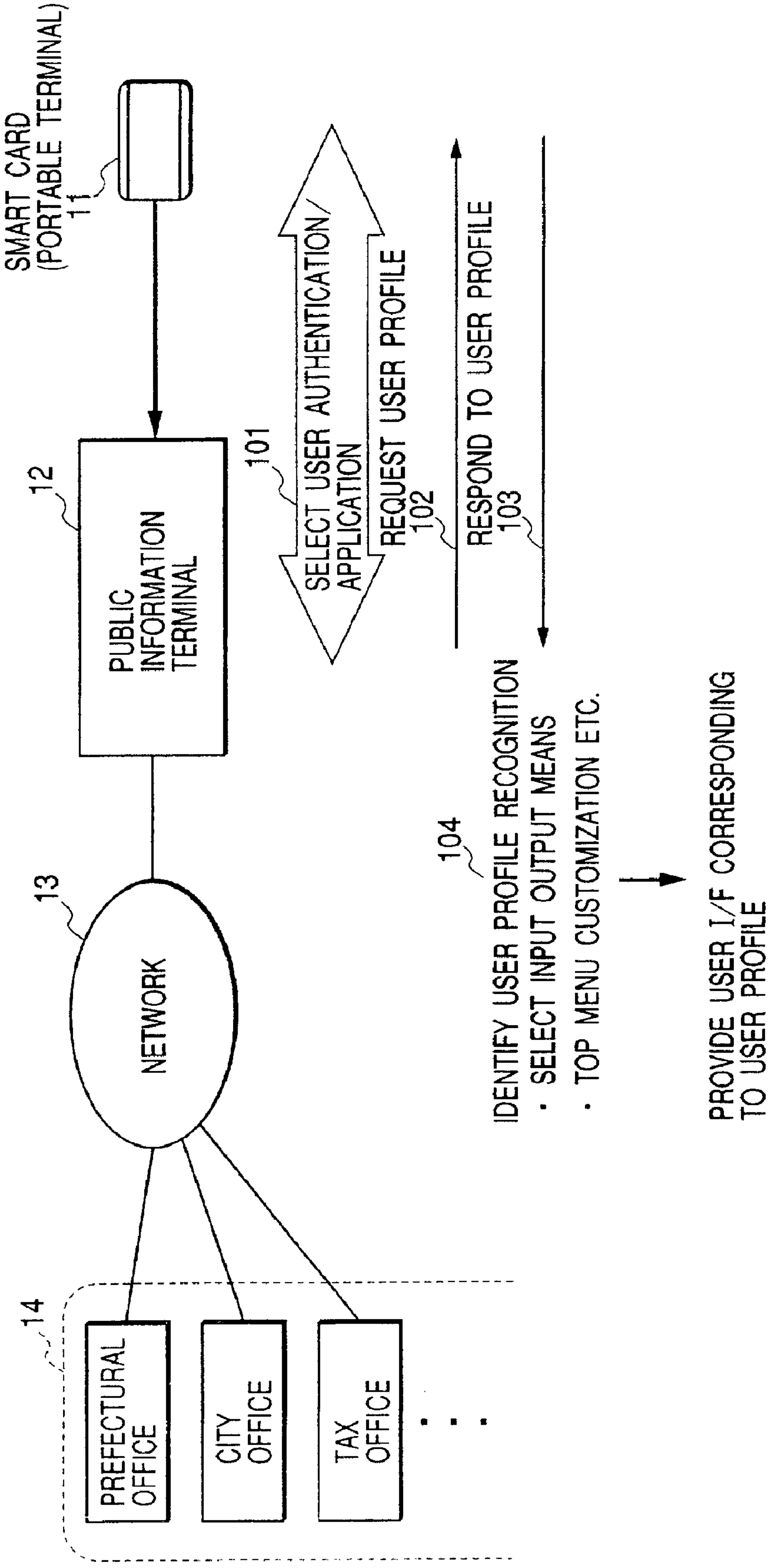
FIG. 1 is a diagram showing a concept of a system in which a smart card (IC card) is used at a public information terminal in the first embodiment.

FIG. 1 is a conceptual diagram of a system according to the embodiment.

In FIG. 1, reference numeral 11 denotes a smart card as a layer-like memory medium of a user profile in the embodiment; 12 a public information terminal as a corresponding terminal for enclosing the memory medium 11; and 13 a network for connecting the public information terminal 12 to a host 14 of each autonomy.

As shown in FIG. 1, the terminal 12 selects a user authentication application from the smart card 11 (101). The terminal 12 requests a user profile (demanded input output I/F information) from the smart card 11 (102). In response to such a request, the smart card 11 returns a user profile response 103. The terminal 12 recognizes the user profile of the smart card 11, selects input output means, and customizes a top menu 104.

In this manner, the public information terminal 12 realizes the selection of the input output means according to the profile of the user, the customization of the top menu, and the like. Therefore, a user I/F corresponding to the user profile can be provided.

A user profile stored in another memory medium such as a portable terminal apparatus or the like can be also used in place of that stored in the IC card.

Figure 2:
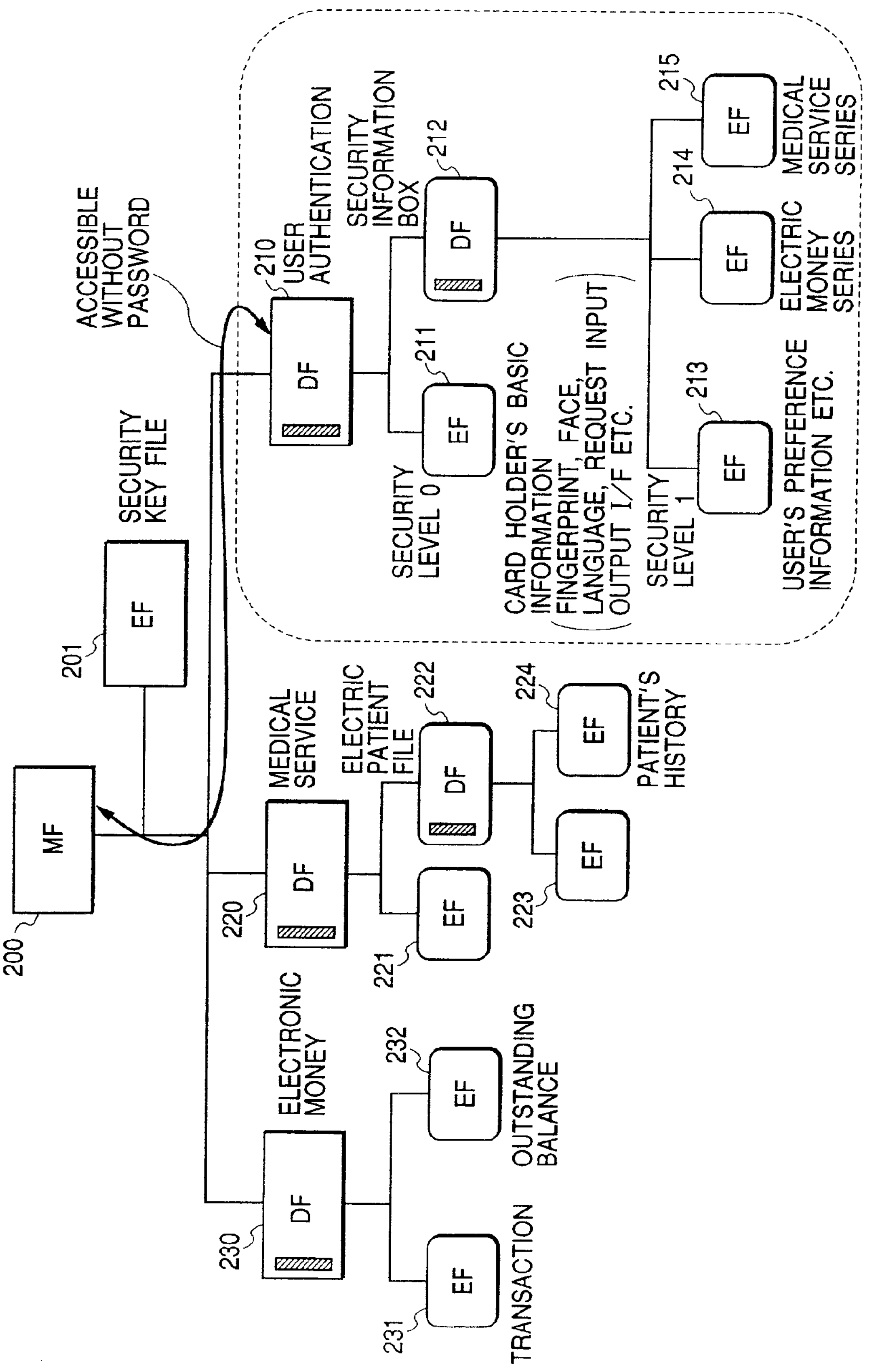
FIG. 2 is a diagram showing a construction of a logic file in the IC card in the first embodiment.

FIG. 2 is a diagram showing an example of a structure of a logic file on the smart card 11 in the embodiment.

In case of using the user profile stored in another memory medium such as a portable terminal apparatus or the like in place of the IC card, another memory medium such as a portable terminal apparatus or the like has the logic file structure shown in FIG. 2.

As shown in FIG. 2, application files which are installed in the smart card 11 are provided under an MF (master file) 200. In the example of FIG. 2, DFs (dedicated files) 210, 220, and 230 are provided for user authentication, medical services, and electronic money, respectively.

An EF (elementary file) 211 and a dedicated file DF 212 are provided under the dedicated file DF 210 for the user authentication application.

The EF (elementary file) 211 stores card holder's basic information (a language which is used by the card subscriber and a demanded input output interface, or as necessary, quantization information of a fingerprint and a feature of the face for the user authentication, etc.). The card holder's basic information is a user profile. The dedicated file DF 212 is a dedicated file for a security information (information for allowing an access only in the case where the terminal user is the subscriber of the smart card 11) storage BOX application.

User profile information having a high security level such as user preference or key information (password) for use of another application is stored in elementary files EFs (213 to 215) under the dedicated file DF 212. Key information for accessing to the DF 230 for storing an electronic money application is stored in the EF 214. Key information for accessing to the DF 220 for storing an medical application is stored in the EF 215.

In the embodiment, an unconditional key (value which is unique to the system) is allocated with respect to an access key of the dedicated file DF 210 for user authentication that has been provided for the low layer.

Therefore, when the smart card 11 is attached to the corresponding terminal apparatus 12, the terminal apparatus 12 can read out the card holder's basic information (the language which is used by the card subscriber and the demanded input output interface, or as necessary, the quantization information of the fingerprint and the feature of the face for the user authentication, etc.) stored in the elementary file EF 211 as user information of the security level "0" in addition to the information in the elementary file EF 201 in which a security key has been stored.

An access to the dedicated file DF 212 for the security information storage BOX application is permitted only when the terminal user is the subscriber of the smart card 11. A key (password) necessary for accessing the dedicated file DF 212 is derived from the elementary file 211 when succeeding in an initial user authentication process. Thus, the security level of the information in the security information storage BOX application is held.

The key information to access to the DF 212 is handed from the EF 211 to the terminal 12 at the time of success in a user authentication process using the holder's information (the password, fingerprint, feature information of the face, etc.) stored in the EF 211. When the key information to access to the DF 212 is obtained, the terminal 12 can access to the EFs 213, 214, and 215.

The DF (dedicated file) 220 stores information of the medical services series. An individual file 222 for an electric patient file application and an elementary file EF 221 are provided in a layer under the DF 220. An information file 223 for an electric patient file application and an information file (patient's history) 224 for an electric patient file application are provided in a layer under the DF 222, and the user profile has been stored.

The DF (dedicated file) 230 is an individual file for an electronic money series application. An information file (transaction history) 231 for an electronic money application, an information file (outstanding balance) 232 for an electronic money application, and the like are provided in a layer under the DF 230, and the user profile has been stored.

Figure 3:
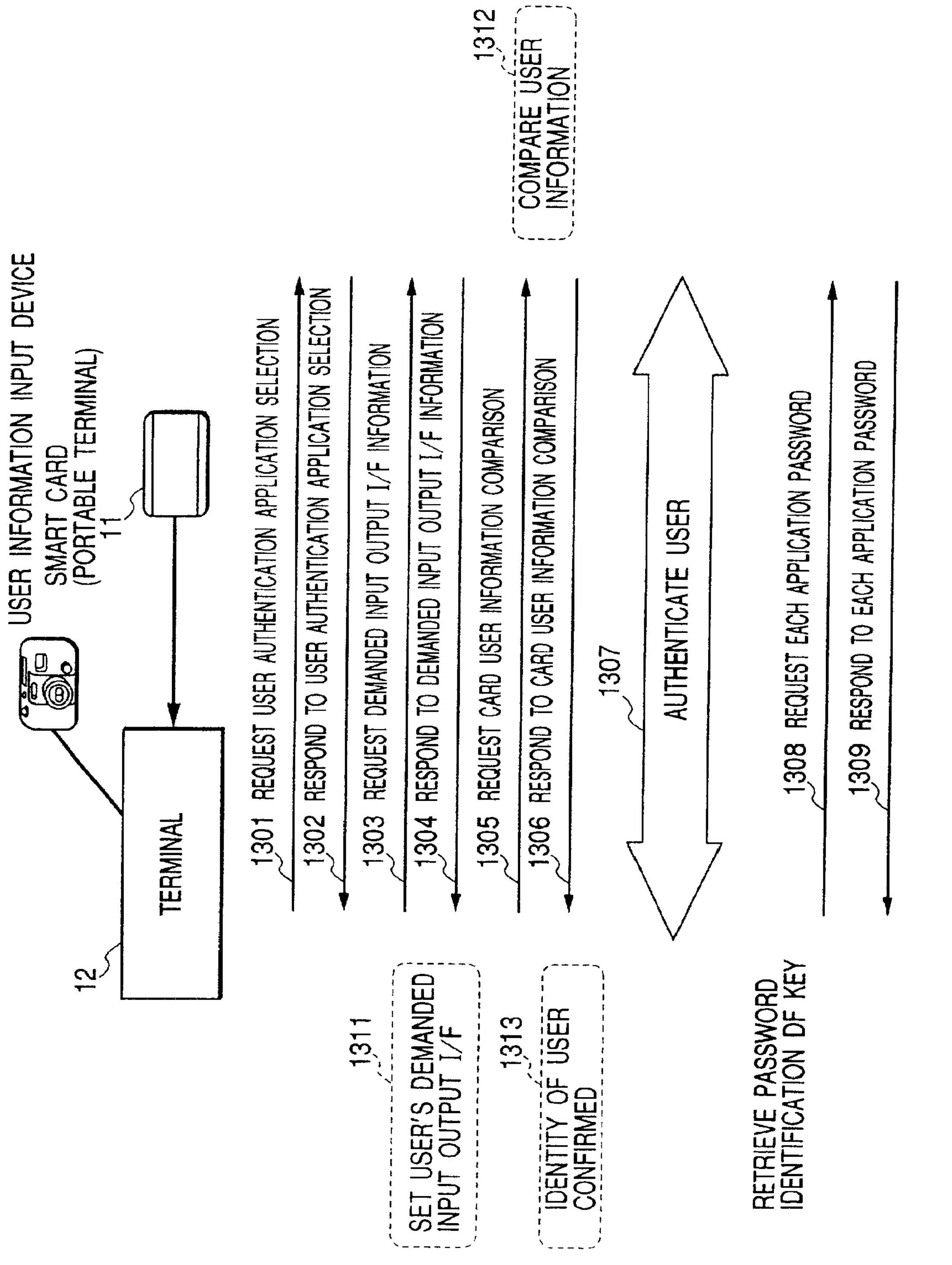
FIG. 3 is a diagram for explaining an initial sequence at the time when a terminal user and a holder of the IC card coincide.

FIG. 3 is a diagram showing an example of a sequence when succeeding in a terminal user identification process at the time when the smart card 11 is attached to the public information terminal 12 of the system in the embodiment.

Figure 4:
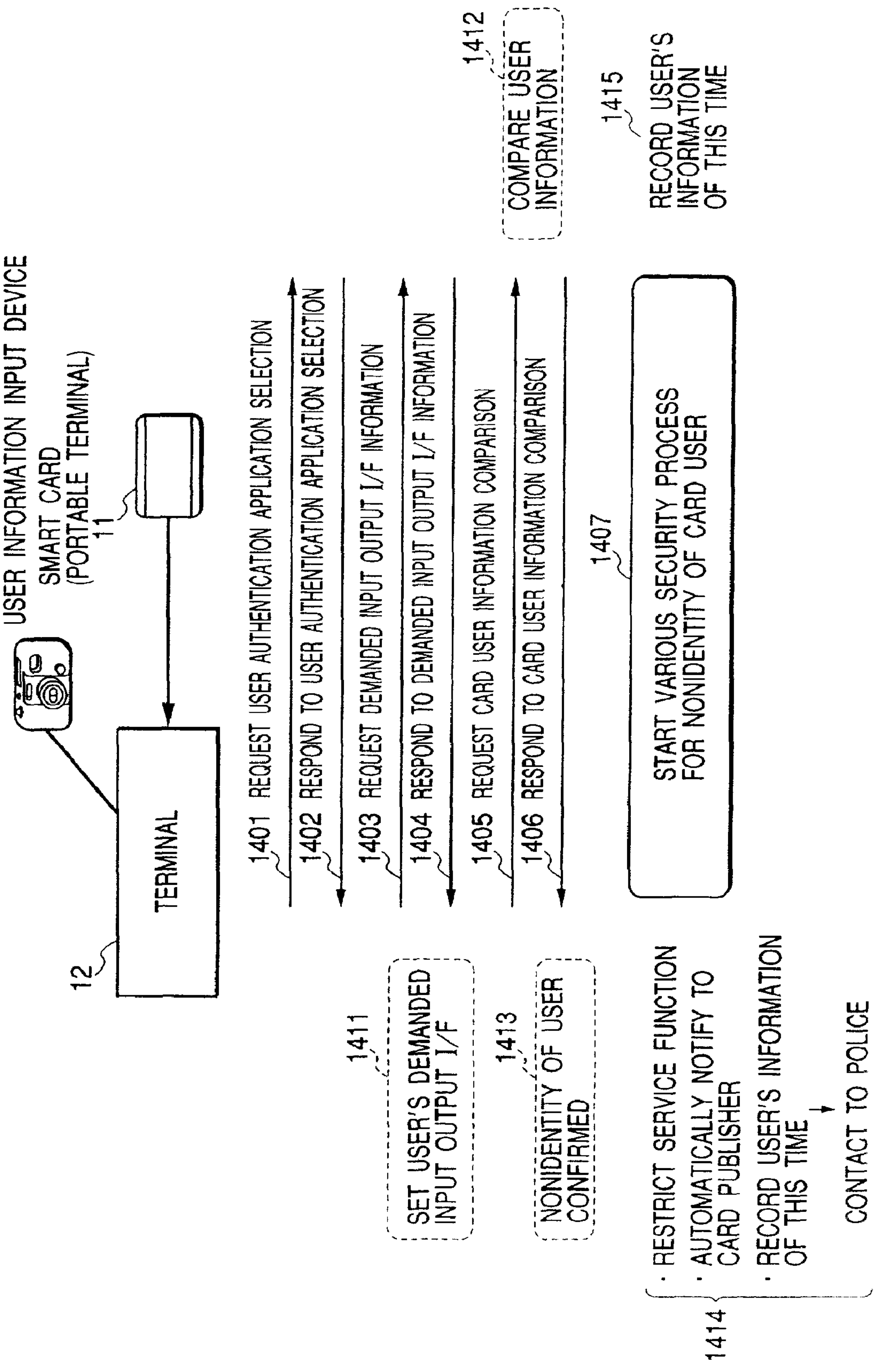
FIG. 4 is a diagram showing an initial sequence at the time when the terminal user and the holder of the IC card does not coincide.

FIG. 4 is a diagram showing an example of a sequence when failing in the terminal user identification process at the time when the smart card 11 is inserted into the public information terminal 12 of the system in the embodiment.

A user profile stored in another memory medium such as a portable terminal apparatus or the like can be also used in place of that stored in the IC card.

Figure 6:
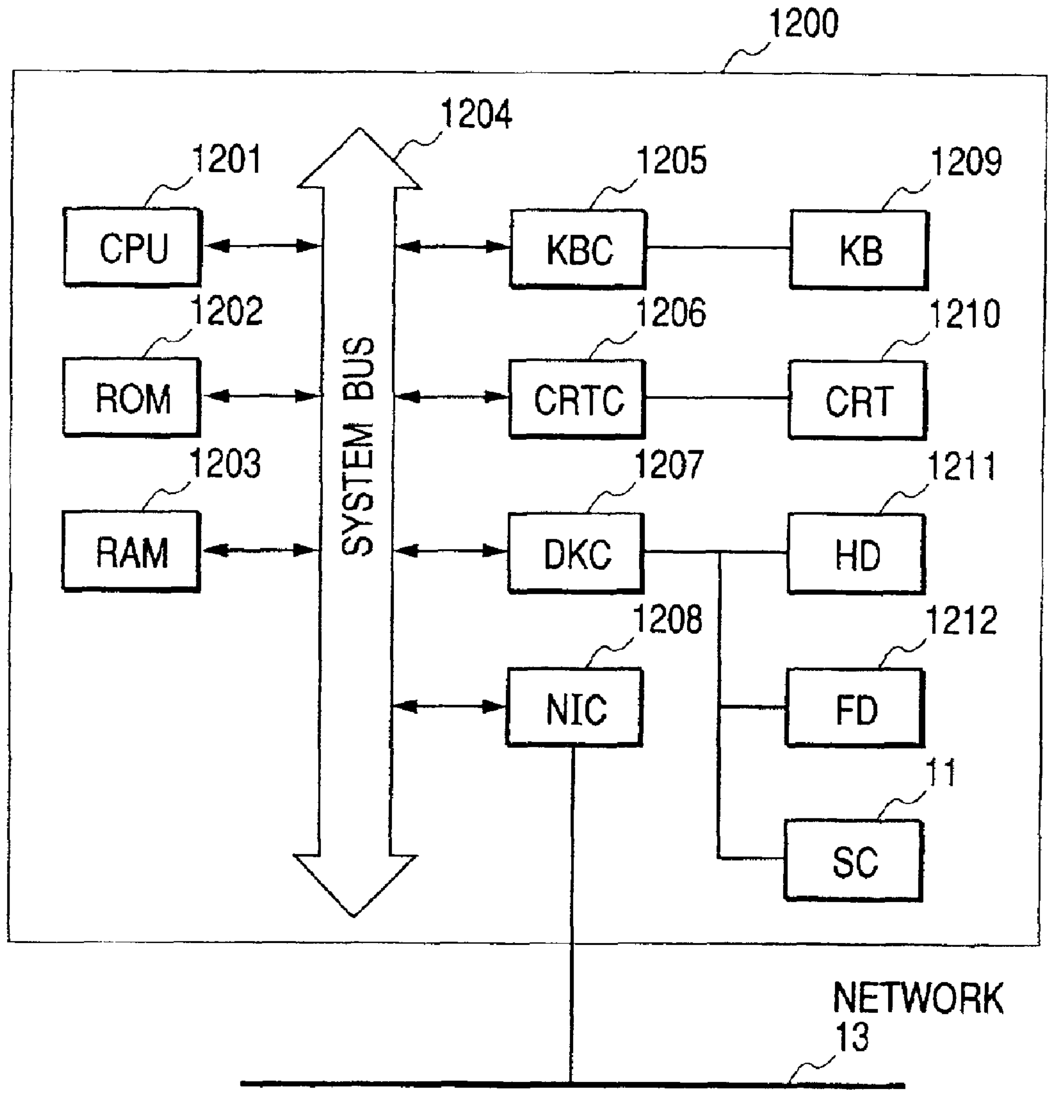
FIG. 6 is a block diagram showing an example of a construction of a computer system.

FIG. 6 is a diagram showing an example of the information terminal 12.

In FIG. 6, reference numeral 1200 denotes a computer (PC).

The PC 1200 has a CPU 1201, executes control software which has been stored in an ROM 1202 or a hard disk (HD) 1211 or is supplied from a floppy disk drive (FD) 1212, and integratedly controls each device connected to a system bus 1204. The control software can be also supplied from a compact disc (CD), a magnetooptic disk (MO), or the like in place of the floppy disk (FD).

Each process in the embodiment is executed by a program stored in the CPU 1201, ROM 1202, or hard disk (HD) 1211 of the PC 1200.

Reference numeral 1203 denotes an RAM which functions as a main memory, a work area, or the like of the CPU 1201. Reference numeral 1205 denotes a keyboard controller (KBC) for controlling an input from a keyboard (KB) 1209 or the like.

Reference numeral 1206 denotes a CRT controller (CRTC) for controlling a display of a CRT display (CRT) 1210.

Reference numeral 1207 denotes a disk controller (DKC) for controlling accesses to the hard disk (HD) 1211 and floppy disk drive (FD) 1212. The disk controller (DKC) also controls an access to the smart card 11.

In case of using the user profile stored in another memory medium such as a portable terminal apparatus or the like in place of the IC card, the DKC 1207 communicates with the portable terminal apparatus or the like.

The hard disk (HD) 1211 stores a boot program (starting program: program to start the execution (operation) of hardware or software of a personal computer), a plurality of applications, a user file, a network management program, and the like.

Reference numeral 1208 denotes a network interface card (NIC) for performing bidirectional data transmission and reception to/from another network apparatus or another PC through the network 13.

Processes shown in FIGS. 3 and 4 will be described with reference to a flowchart of FIG. 5.

Figure 5:
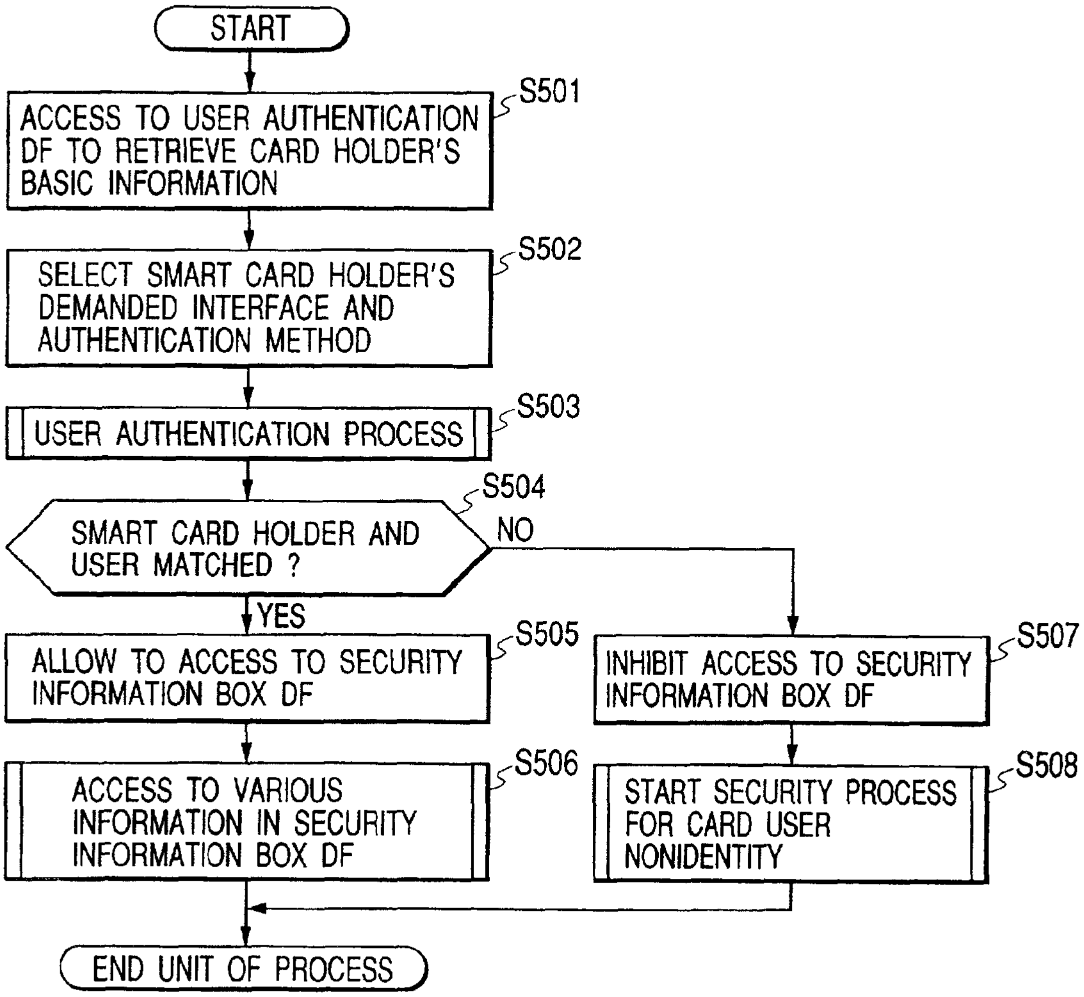
FIG. 5 is a flowchart for explaining an outline of a processing procedure which is executed on the terminal side at the time when the IC card is attached.

FIG. 5 shows a flowchart of an example of a processing procedure which is executed when the smart card 11 is attached to the public information terminal 12. A user profile stored in another memory medium such as a portable terminal apparatus or the like can be also used in place of that stored in the IC card.

The program shown in the flowchart of FIG. 5 has been stored in the floppy disk. The CPU 1201 in FIG. 6 as a microcomputer reads out the program from the floppy disk by the floppy disk drive (FD) 1212 and executes it. The floppy disk is a memory medium for storing the program which is executed by the CPU 1201 so that the CPU 1201 can read it out. The control software program in FIG. 5 can be also supplied from a compact disc (CD), a magnetooptic disk (MO), or the like in place of the floppy disk. This program can be also supplied through the network 13.

In first step S501, a selection process (101 in FIG. 1, 1301 and 1302 in FIG. 3, 1401 and 1402 in FIG. 4) of the dedicated file DF 210 for user authentication in which the user authentication application has been stored is first executed, the elementary file EF 211 for card holder's basic information is accessed, and desired input output I/F information of the user is read out (102 and 103 in FIG. 1, 1303 and 1304 in FIG. 3, 1403 and 1404 in FIG. 4). This input output I/F information is an example of the user profiles.

Subsequently, in step S502, the input output I/F corresponding to it is selected and set (1311 in FIG. 3, 1411 in FIG. 4). The selection of the input output I/F is a selection of a language (Japanese, English, Spanish, German, French, etc.), a selection of a touch panel input or an audio input, or the like. When the touch panel is selected, a user authentication by a password input from the touch panel is performed. A selection of a fingerprint input device or a photographing device of the face is included in the selection of the input output I/F. For example, if the information stored in the EF 211 is information for selecting the touch panel and English, the CPU 1201 forms a guidance screen in English and displays it onto the touch panel 1210. If the information stored in the EF 211 is information for selecting the audio input and French, an audio guidance is outputted in French.

After that, step S503 follows and the user authentication process is executed by using a desired interface of the user. This process is a process for identifying the matching between the user who uses the public information terminal 12 and the holder of the smart card 11 in accordance with the authentication method by using the data stored in the elementary file 211 (1305 and 1306 in FIG. 3, 1405 and 1406 in FIG. 4).

If the desired input I/F of the user is the password input from the touch panel, the CPU 1201 inputs the password from the touch panel via the KBC 1205. In this case, if the desired output I/F of the user is the touch panel in English, the CPU 1201 forms a guidance screen for password input in English and displays it onto the touch panel 1210. The desired input output I/F of the user is an example of the user profiles.

The CPU 1201 sends user information (password, fingerprint, feature of the face, etc.) inputted by the desired input I/F of the user to the smart card 11 (1305 in FIG. 3, 1405 in FIG. 4). The smart card 11 compares the received user information with the user information stored in the EF 211 (1312 in FIG. 3, 1412 in FIG. 4) and returns a comparison result to the terminal 12 (1306 in FIG. 3, 1406 in FIG. 4).

In step S504, as a result of the authentication process executed in step S503, whether the holder of the smart card 11 and the user of the public information terminal 12 are matched or not is discriminated.

As a discrimination result in step S504, if the card holder and the terminal user are matched (1313 in FIG. 3), step S505 follows and an access to the dedicated file DF 212 as a security information BOX application is allowed. That is, a key (password) to access to the dedicated file 212 is derived from the elementary file 211.

In step S506, a user authentication process (1307 in FIG. 3) is executed with the dedicated file DF 212 as a security information BOX application. After completion of the user authentication process, passwords for the other dedicated files DFs 220 and 230 stored in the smart card 11 are requested (1308 in FIG. 3). Each application password is read out from the elementary files 215 and 214 (1309 in FIG. 3). Information accesses to the dedicated files 220 and 230 are performed by using the passwords in accordance with allowance services. As mentioned above, in order to access to the dedicated files 220 and 230, a user authentication in 1313 (S503) and a user authentication in 1307 are necessary.

As a discrimination result in step S504, if the card holder and the terminal user are not matched (1413 in FIG. 4), step S507 follows and the access to the dedicated file DF 212 for security information BOX application is inhibited.

Subsequently, in step S508, various security processes when the card holder is not matched are autonomously started (1407). They are the processes for restricting a service function, automatically notifying to a card publisher, recording information of the terminal user, making a contact to a police, and the like (1414, 1415 in FIG. 4).

In the embodiment, by sequentially executing the above processes, when the public information terminal 12 is used, a desired input output interface of the person who uses the public information terminal 12 can be recognized by the public information terminal 12 side before information for initial authentication is inputted.

Thus, the information system can be made operative by using the desired input output interface of the user, and the identity of the user can be confirmed by desired user authenticating means.

With respect to various information which needs higher security, after the authentication process was successful, the access to a desired information storage file is allowed. Therefore, while a use efficiency is fairly improved, a security level equivalent to that by the existing user's profile storing method can be assured.

The invention can be also preferably used in case of combining with an apparatus which can be carried by the user and has a storing function such that an authentication key can be allocated every individual file constructed in a layer manner.

There is subsequently shown an example of customizing a top information menu by downloading the top information menu matched with the user profile from the information center in accordance with the user profiles of the terminal user stored in the attached smart card (IC card).

A user profile stored in another memory medium such as a portable terminal apparatus or the like can be also used in place of that stored in the IC card.

Figure 7:
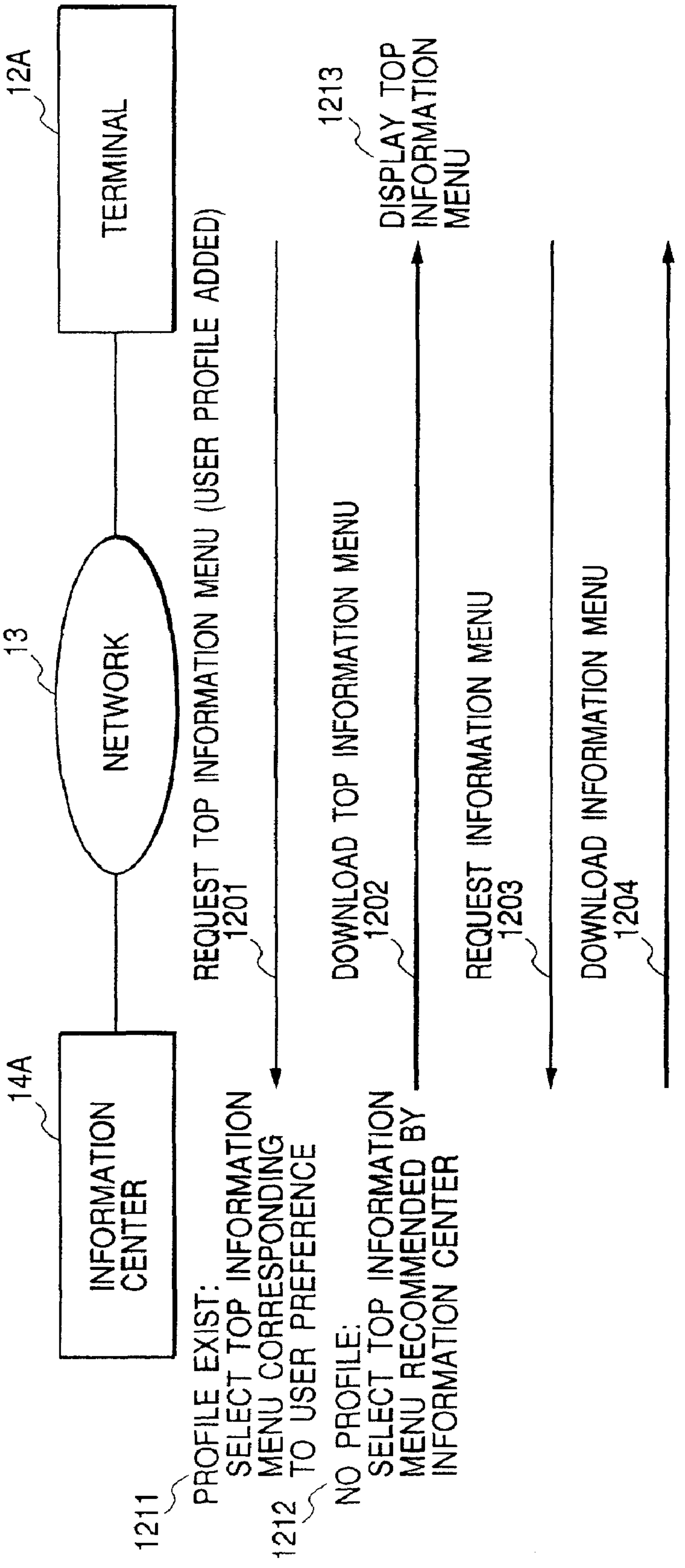
FIG. 7 is a diagram for explaining a message sequence between an information center and one terminal in the second embodiment.
Figure 8:
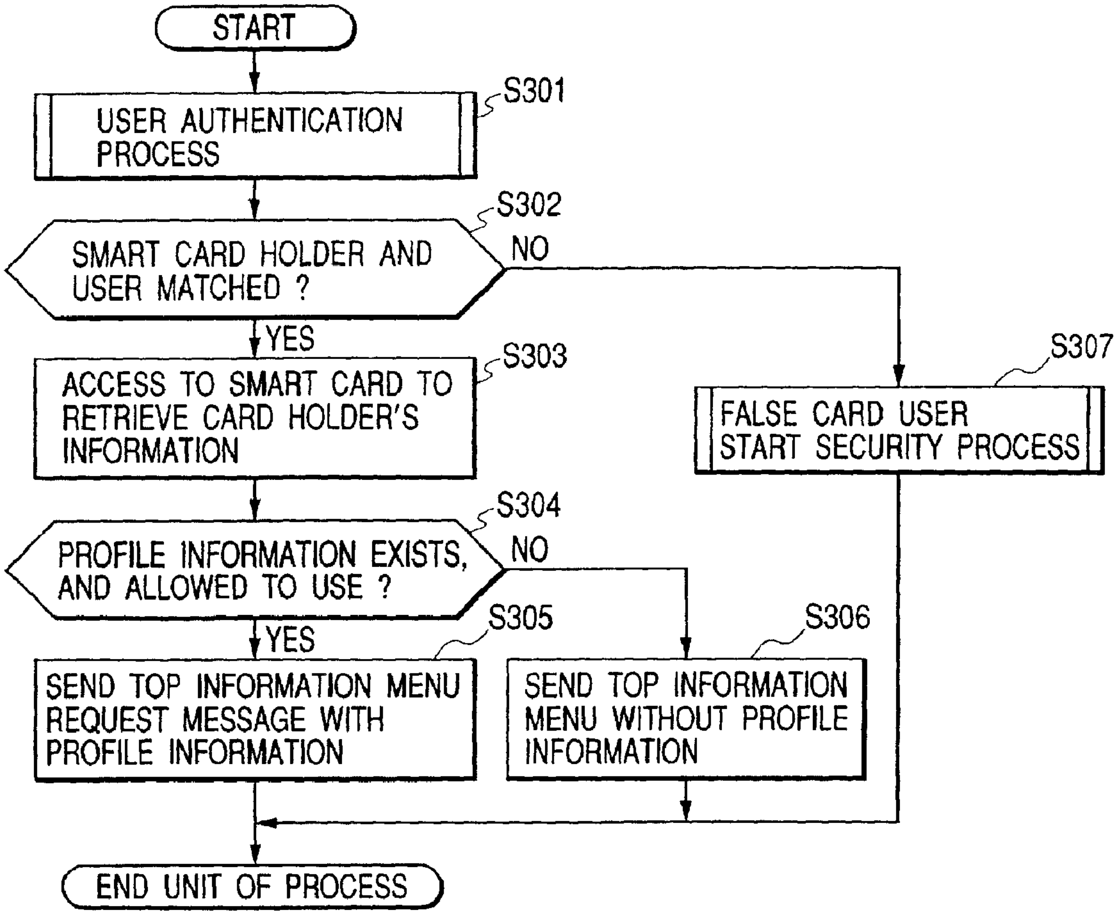
FIG. 8 is a flowchart for a concept of processes on the terminal side at the time when an IC card is attached in the second embodiment.
Figure 9:
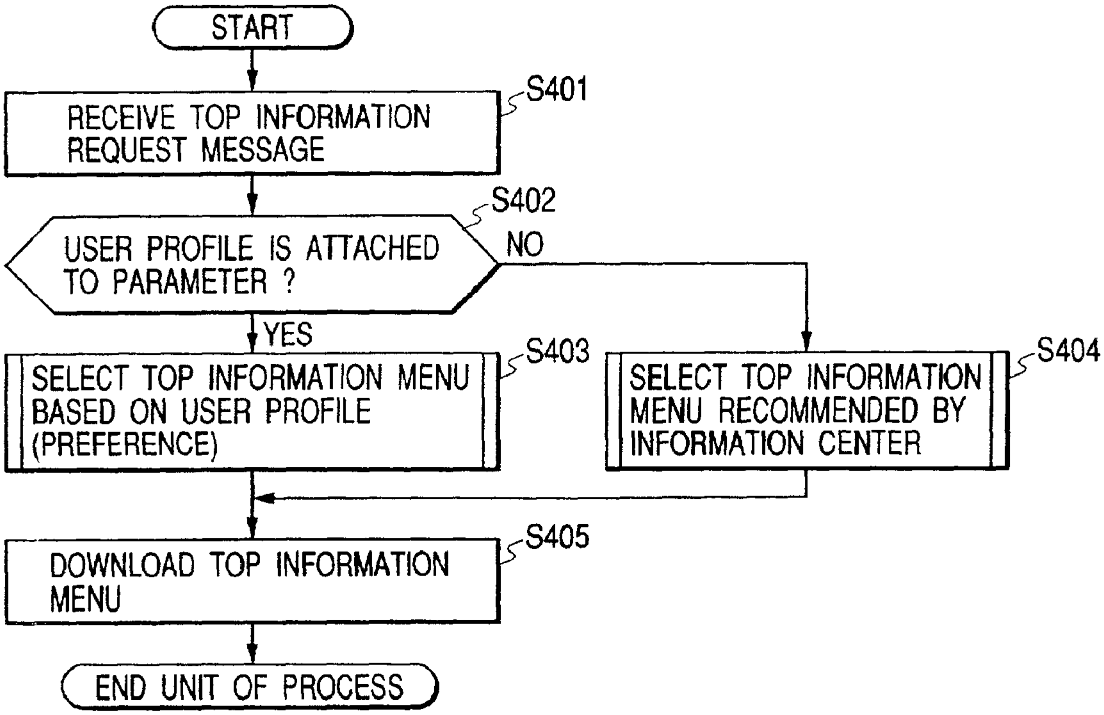
FIG. 9 is a flowchart for explaining a concept of processes on the information center side at the time when a top information request message is received in the second embodiment.

FIG. 7 shows an outline of a sequence in the embodiment. FIG. 8 is a processing flowchart on the information terminal apparatus side. FIG. 9 is a processing flowchart on the information center side. An information center 14A is included in the host 14 in FIG. 1 and has a construction similar to that of a terminal 12A shown in the diagram. However, the smart card 11 is not connected to the information center 14A.

Programs shown by the flowcharts of FIGS. 8 and 9 have been stored in the floppy disk. The CPU 1201 in FIG. 6 as a microcomputer reads out the program from the floppy disk by the floppy disk drive (FD) 1212 and executes it. The floppy disk is a memory medium for storing the program which is executed by the CPU 1201 so that it can be read out by the CPU 1201. The control software programs in FIGS. 8 and 9 can be also supplied from a compact disc (CD), a magnetooptic disk (MO), or the like in place of the floppy disk. The programs can be also supplied through the network 13.

First, the terminal 12A to which the smart card has been attached executes a discrimination (user authentication) process (steps S301, S302) for discriminating whether the card holder and the terminal user are matched or not between the terminal and the smart card 11. Another memory medium such as a portable terminal apparatus or the like can be also used in place of the IC card.

When the user of the information terminal apparatus and the card holder are not matched, a security process such as notification to the card publisher or the like (step S307) is started. One unit of process is finished.

As a discrimination result in step S302, when the user of the information terminal apparatus and the card holder are matched, the profile of the card holder is retrieved by accessing to the smart card 11 (step S303). The presence or absence of the profile is confirmed and whether the user has been allowed to use or not is confirmed (step S304).

As a confirmation result in step S304, if the user profile information has been stored and the user has been allowed to use, a top information menu request message to which the profile information has been added is sent to the information center 14A (step S305) as shown at 1201 in FIG. 7.

As a confirmation result in step S304, if the user profile is not stored or, although it has been stored, if the user is not allowed to use, a top information menu request message to which no user profile information is added is sent to the information center (step S306). One unit of process is finished.

Processes of the information center 14A will now be described with reference to the flowchart of FIG. 9.

When the top information request message is received, the information center 14A discriminates whether the user profile has been added to this message or not (steps S401, S402).

As a discrimination result, if the user profile has been added, the top information menu according to the user profile (preference, age, etc.) is selected (step S403) as shown at 1211 in FIG. 7. After that, the selected information is downloaded into the public information terminal apparatus 12A through the network 13 (step S405) as shown at 1202 in FIG. 7.

As a discrimination result in step S402, if the user profile is not added, the top information menu recommended on the information center side is selected (step S404) as shown at 1212 in FIG. 7. After that, the selected information is downloaded into the public information terminal apparatus 12A (step S405). The top information menus according to the user profiles and the recommended top information menus have previously been stored in the RAM 1203 or hard disk in the information center 14A. The CPU 1201 of the information center 14A reads out the top information menu corresponding to a top information menu request from the terminal 12A from the RAM 1203 or hard disk.

The information terminal apparatus 12A decodes the downloaded top information menu file and displays it (1213 in FIG. 7).

The user of the terminal 12A watches the top information menu and requests the next information menu. The terminal 12A sends the information menu request to the information center 14A (1203 in FIG. 7). The information center 14A selects and downloads a proper information menu in a manner similar to steps S403 and S404 in FIG. 9 (1204 in FIG. 7). The terminal 12A displays the downloaded information menu.

In a modification, when the smart card 11 is attached, the discriminating processes in steps S301 and S302 are omitted, the processes in steps S303 to S305 and S306 are executed, and the top menu is downloaded. In the top menu, the user authentication process in step S301 is performed and whether the holder of the smart card 11 and the user are matched or not is discriminated in step S302. As a discrimination result, if they are not matched, a security process in step S307 is started.

Figure 10:
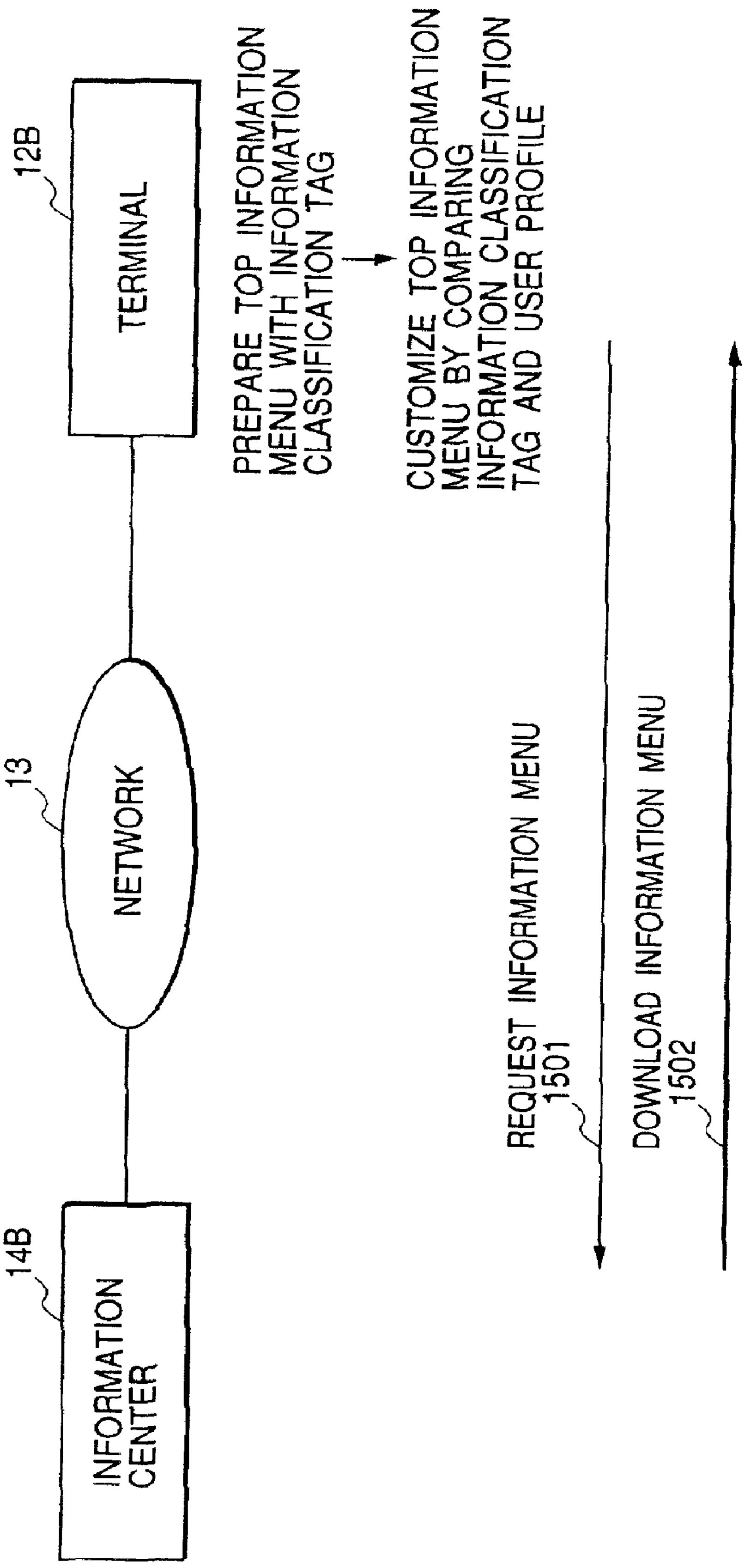
FIG. 10 is a diagram for explaining a message sequence between an information center and one terminal in the third embodiment.

An example in which a storing location of the top information menu is provided for the public information terminal apparatus side will now be explained. FIG. 10 is a diagram showing an outline of a sequence in the embodiment.

FIG. 11 is a diagram showing an example of source codes for the top information menu of the public information terminal apparatus to which display control information according to the user profile has been additionally described. An HTML (Hyper Text Markup Language) is used as an example of a text markup language. Further, expanded display control tags of HTML based on the user profile are used in FIG. 11.

Display tags (1601 to 1607) underlined among the source codes are an example of the expanded display control tags in the embodiment. In the embodiment, two tags for display control are expanded.

One of the expanded tags for display control is "display is performed only when it is matched with set conditions" <Only set conditions> and display contents </Only>.

Another expanded tags for display control is "display is performed only when it is not matched with set conditions" <Not set conditions> and display contents </Not>.

Figure 12:
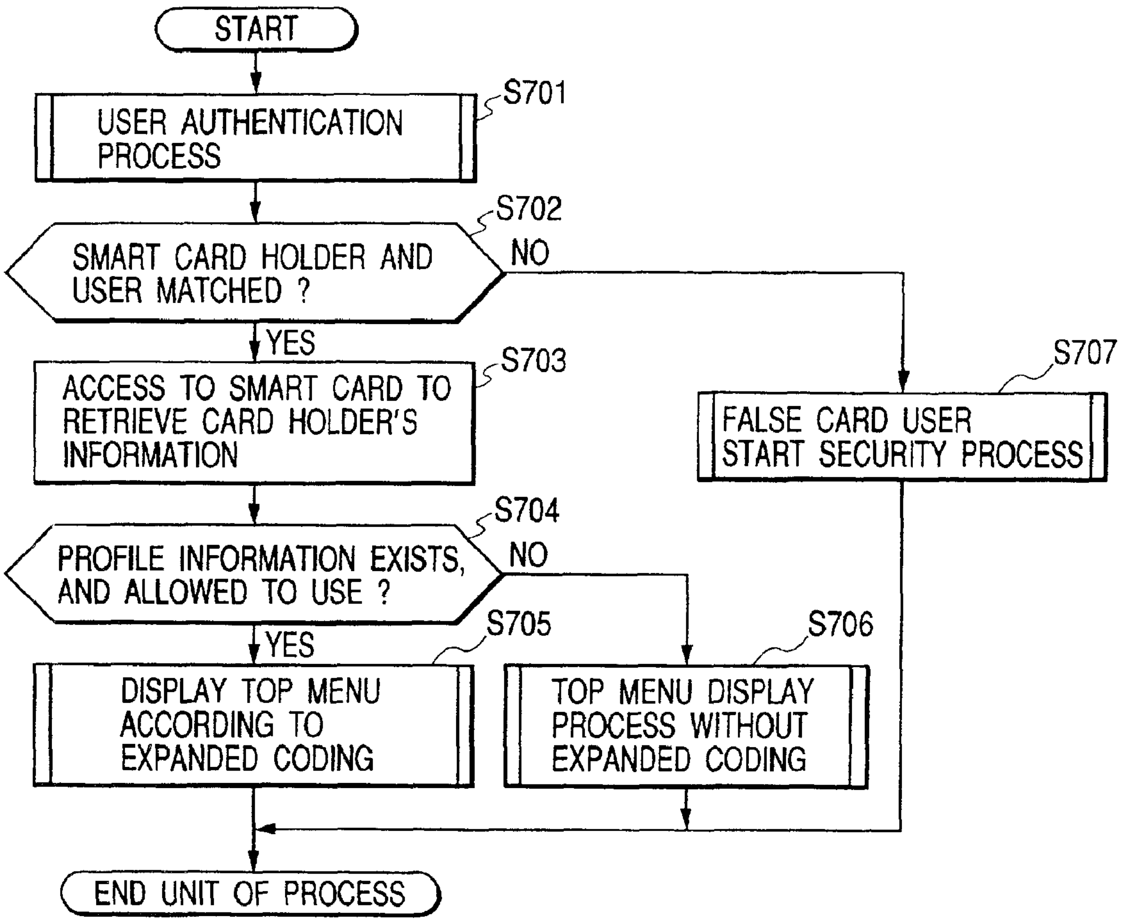
FIG. 12 is a flowchart for a concept of processes on the terminal side at the time when an IC card is attached in the third embodiment.

FIG. 12 is a flowchart showing an example of a processing procedure on the information terminal apparatus side. A program shown by the flowchart of FIG. 12 has been stored in the floppy disk. The CPU 1201 in FIG. 6 as a microcomputer reads out the program from the floppy disk by the floppy disk drive (FD) 1212 and executes it. The floppy disk is a memory medium for storing the program which is executed by the CPU 1201 so that it can be read out by the CPU 1201. The control software program in FIG. 12 can be also supplied from a compact disc (CD), a magnetooptic disk (MO), or the like in place of the floppy disk. This program can be also supplied through the network 13.

First, a terminal 12B to which the smart card has been attached executes a discrimination (user authentication) process for discriminating whether the card holder and the terminal user are matched or not (steps S701, S702) between the terminal and the smart card 11. Another memory medium such as a portable terminal apparatus or the like can be also used in place of the IC card.

As a discrimination result, when the user of the information terminal apparatus and the card holder are not matched, a security process such as notification to the card publisher or the like (step S707) is started. One unit of process is finished.

As a discrimination result in step S702, when the user of the information terminal apparatus and the card holder are matched, the profile of the card holder is retrieved by accessing to the smart card 11, the presence or absence of the profile is confirmed, and whether the user has been allowed to use or not is confirmed (steps S703, S704).

As a confirmation result, if the user profile information has been stored and the user has been allowed to use, step S705 follows. In accordance with the profile information, an expanded HTML source file described by the markup text language for top information menu display control stored in the RAM 1203 of the terminal 12B or the hard disk is formed on a screen of the top information menu in accordance with the user profile conditions, and the top menu is displayed.

Occupancies, ages, and the like of the card holder himself and his family are included in the user profile information. Expanded HTML source files for top information menu display control corresponding to the occupancies, ages, and the like of the card holder himself and his family have previously been stored in the RAM 1203 of the terminal 12B or the hard disk.

As a discrimination result in step S704, if the user profile is not stored or, although it has been stored, if the user is not allowed to use, step S706 follows. All of display items described on the expanded HTML source file by the markup text language for top information menu display control stored in the RAM 1203 of the terminal 12B or the hard disk are displayed (displayed without performing a display control by the expanded display tags). One unit of process is finished.

In a modification, when the smart card 11 is attached, the discriminating processes in steps S701 and S702 are omitted, the processes in steps S703 to S705 and S706 are executed, and the top menu is displayed. In the top menu, the user authentication process in step S701 is performed and whether the holder of the smart card 11 and the user are matched or not is discriminated in step S702. As a discrimination result, if they are not matched, a security process in step S707 is started.

Figure 13:
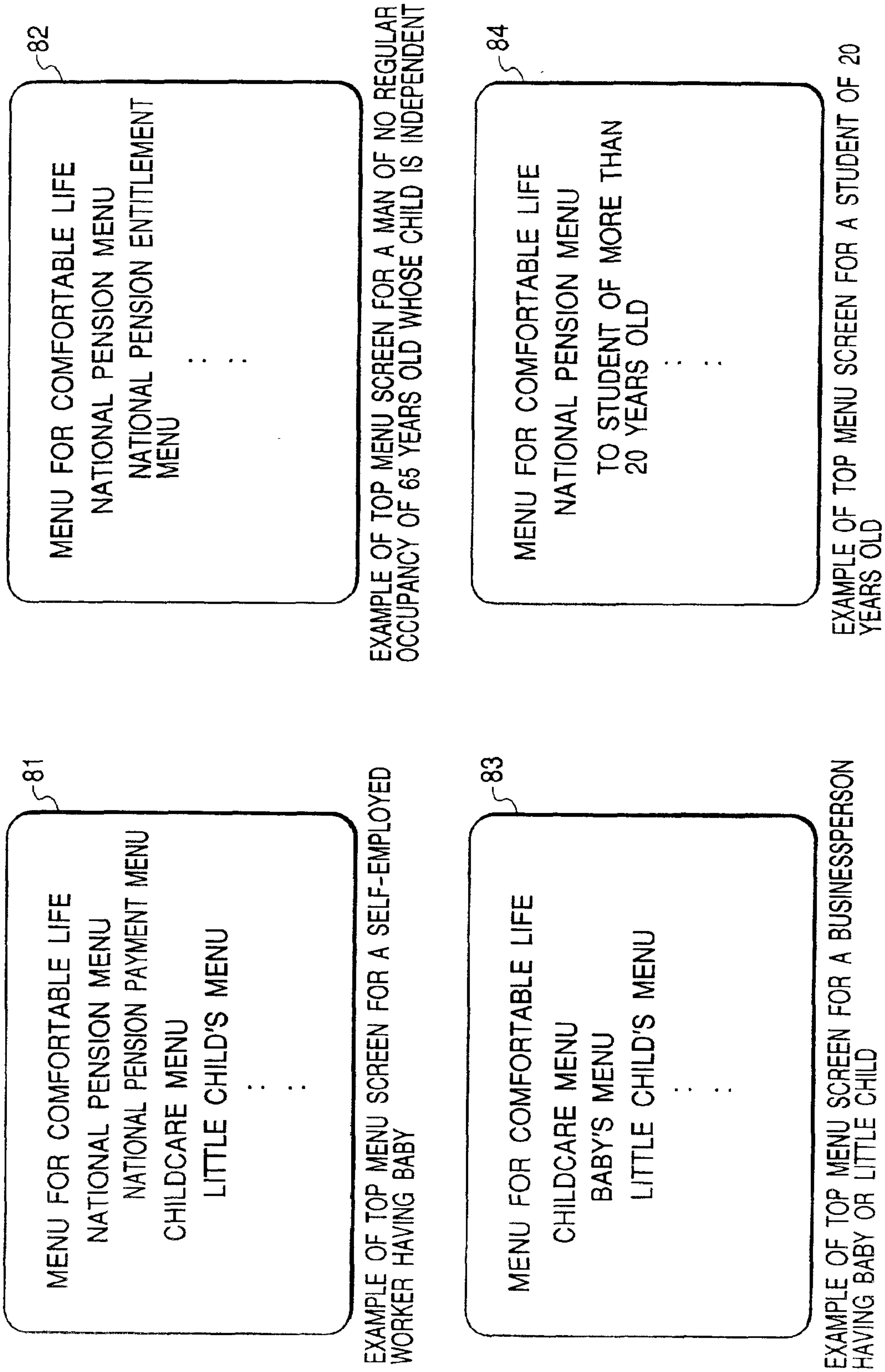
FIG. 13 is a diagram showing a display example of a top information menu of each user profile in the third embodiment.

FIG. 13 shows a display example of each user profile using the source codes. The display example shown in FIG. 13 relates to an example in which a display is performed in step S705. Also in step S403 in FIG. 9, a top menu similar to that in FIG. 13 is formed in accordance with the user profile (occupancy, age, family construction, etc.).

In FIG. 13, a first display example 81 is an example of an information menu for the user as a self-employed worker having a child (of 4 to 6 years old).

A second display example 82 is an example of an information menu for the user of no regular occupancy of more than 65 years old whose child is independent.

Further, a third display example 83 is an example of an information menu for the user as a businessperson having baby (of less than 3 years old) or a little child (of 4 to 6 years old).

A fourth display example 84 is an example of an information menu for the user of a student of 20 years old.

Figure 14:
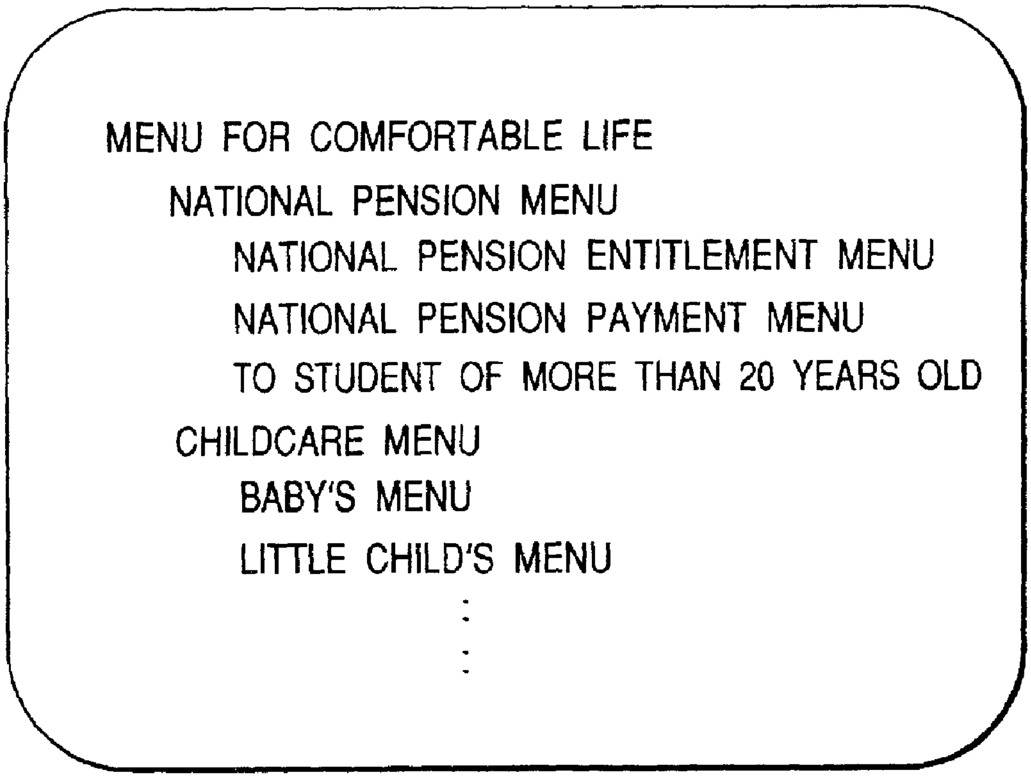
FIG. 14 is a diagram showing a display example of a top information menu in the case where the user profile is not used in the third embodiment.

FIG. 14 is a diagram showing an example of a top information menu for the user who does not expect a menu construction by the use of the user profile or whose user profile information is not stored in the IC card. The display example shown in FIG. 14 is an example in which a display is performed in step S706. The top information menu which is selected in step S403 in FIG. 9 is also similar to that in FIG. 14.

As shown in those display examples, semicustomization of the top information menu for each user can be realized by using a single source file, and convenience in the desired information retrieval of the user of the public information terminal apparatus can be improved.

A compact scale of coding of a menu for various user layers is realized by one expanded HTML source file as a markup text language for top information menu display control and it is stored into the public information terminal apparatus 12B, so that the public information terminal apparatus itself can display the top information menu in an off-line manner. There is, consequently, a new advantage such that the loads of the communication network 13 and information center 14B can be reduced.

In the embodiment, the example of using the IC card as a memory medium of the user profile has been shown. The invention is also effective with respect to a combination with an apparatus such as a portable terminal apparatus or the like which can be connected to another apparatus and can be carried by the user and has a function for storing the user profile.

Although the HTML (Hyper Text Markup Language) has been used as an example of markup text languages to be expanded, if a communication network medium is a radio communication path, a similar effect can be realized by performing an expansion such that the user profile information is added to a discrimination element to a markup language such as HDML (Handheld Device Markup Language), WML (Wireless Markup Language), or the like in which the user profile corresponding process has been expanded or to a scene describing language such as VRML (Virtual Reality Modeling Language) or the like with respect to a moving image menu such as MPEG4 or the like.

The invention can be applied to the apparatus 12 comprising one apparatus or a system comprising a plurality of apparatuses (for example, a host computer, an interface device, a reader, a printer, etc.).

The following case is also incorporated in the purview of the invention, that is, in order to make the various devices operative so as to realize the functions of the embodiments mentioned above, program codes of software for realizing the functions of the embodiments mentioned above are supplied to an apparatus connected to the various devices or to a computer in the system, and the various devices are made operative in accordance with the program stored in the computer (a CPU or an MPU) of the system or apparatus, thereby embodying the invention.

In this case, the program codes themselves of the software realize the functions of the embodiments mentioned above. The program codes themselves and means for supplying the program codes to the computer, for example, a memory medium in which the program codes have been stored construct the invention. As a memory medium for storing the program codes, for example, it is possible to use a floppy disk, a hard disk, an optical disk, a magnetooptic disk, a CD-ROM, a magnetic tape, a non-volatile memory card, an ROM, or the like.

In not only a case where the functions described in the embodiments mentioned above are realized by executing the supplied program codes by the computer but also a case where the program codes cooperate with the OS (operating system) which is operating in the computer or another application software or the like and the functions shown in the embodiments mentioned above are realized, those program codes are included in the embodiments of the invention.

Further, the invention also incorporates a case where the supplied program codes are stored into a memory equipped for a function expanding board of a computer or a function expanding unit connected to a computer and, thereafter, a CPU or the like provided for the function expanding board or function expanding unit executes a part or all of the actual processes on the basis of instructions of the program codes, and the functions in the embodiments mentioned above are realized by those processes.

As an information transmission system which can add information for identifying the feature of a display object every display object, an embodiment in which a playback moving image is customized by the user on the audience side in accordance with a profile of the broadcast audience in a delivery system of moving image contents of the broadcast type using the MPEG system is subsequently shown.

Figure 15:
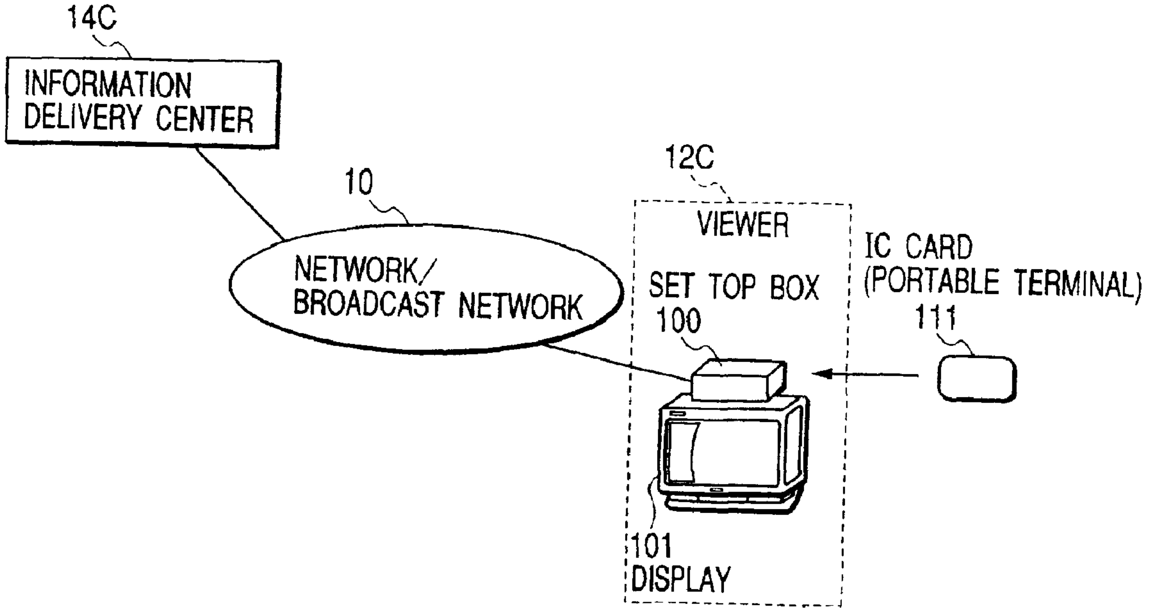
FIG. 15 is a diagram showing a concept of a delivery contents optimization reproduction system in the fourth embodiment.

FIG. 15 shows a conceptual diagram of a construction of the system.

Reference numeral 10 denotes a network or broadcast network as a delivery medium of the contents; 14C an information delivery center for delivering moving image contents of the MPEG system; 12C a receiving terminal (hereinafter, referred to as a viewer); and 111 an IC card (smart card) as a user identifying module in which the user profiles have been stored. A user profile stored in another memory medium such as a portable terminal apparatus or the like can be also used in place of that stored in the IC card.

In the embodiment, a case where the viewer 12C is divided into a set top box 100 and a display 101 will be described.

Figure 16:
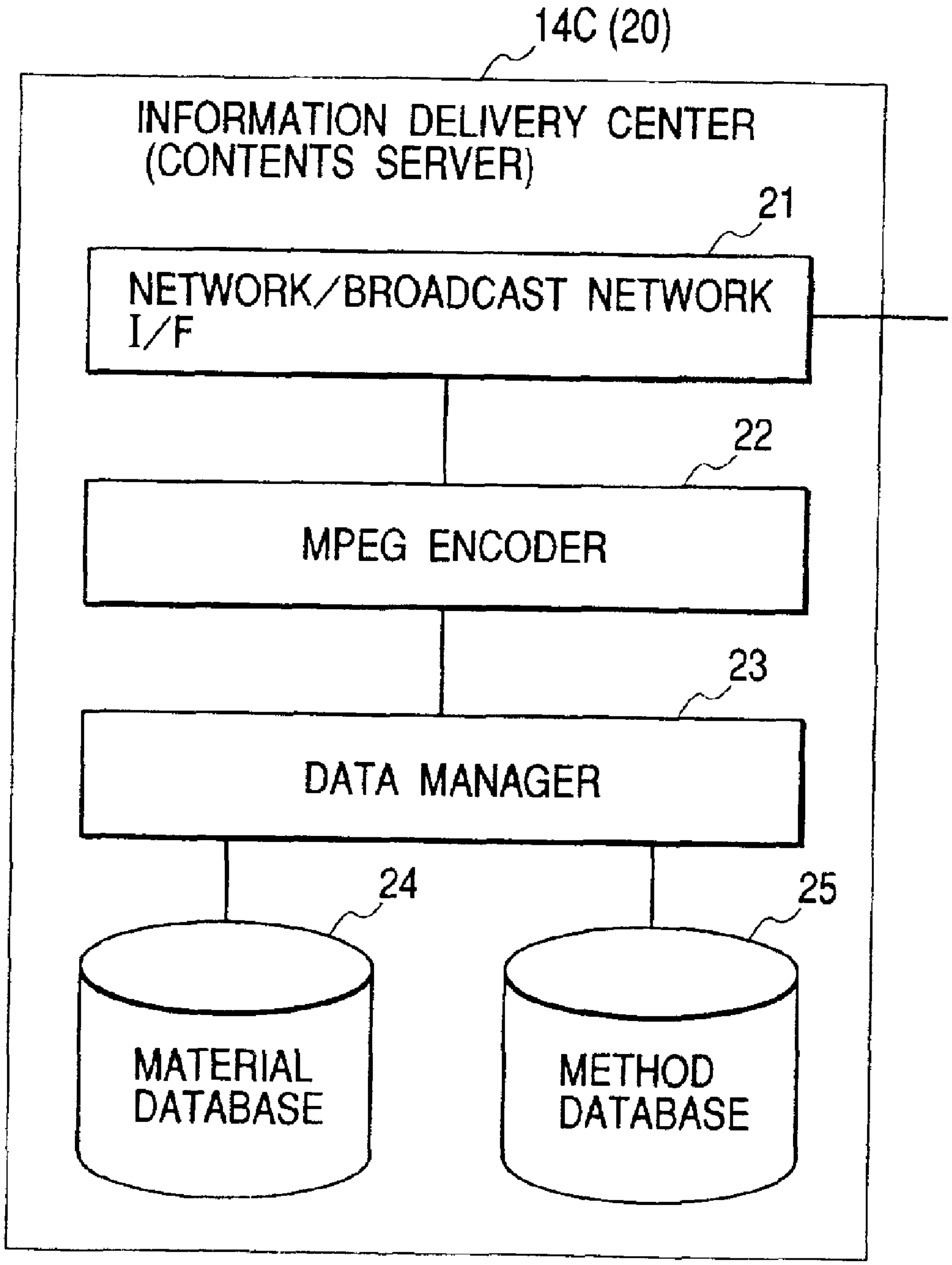
FIG. 16 is a diagram showing a concept of a construction of an information delivery center in the fourth embodiment.
Figure 17:
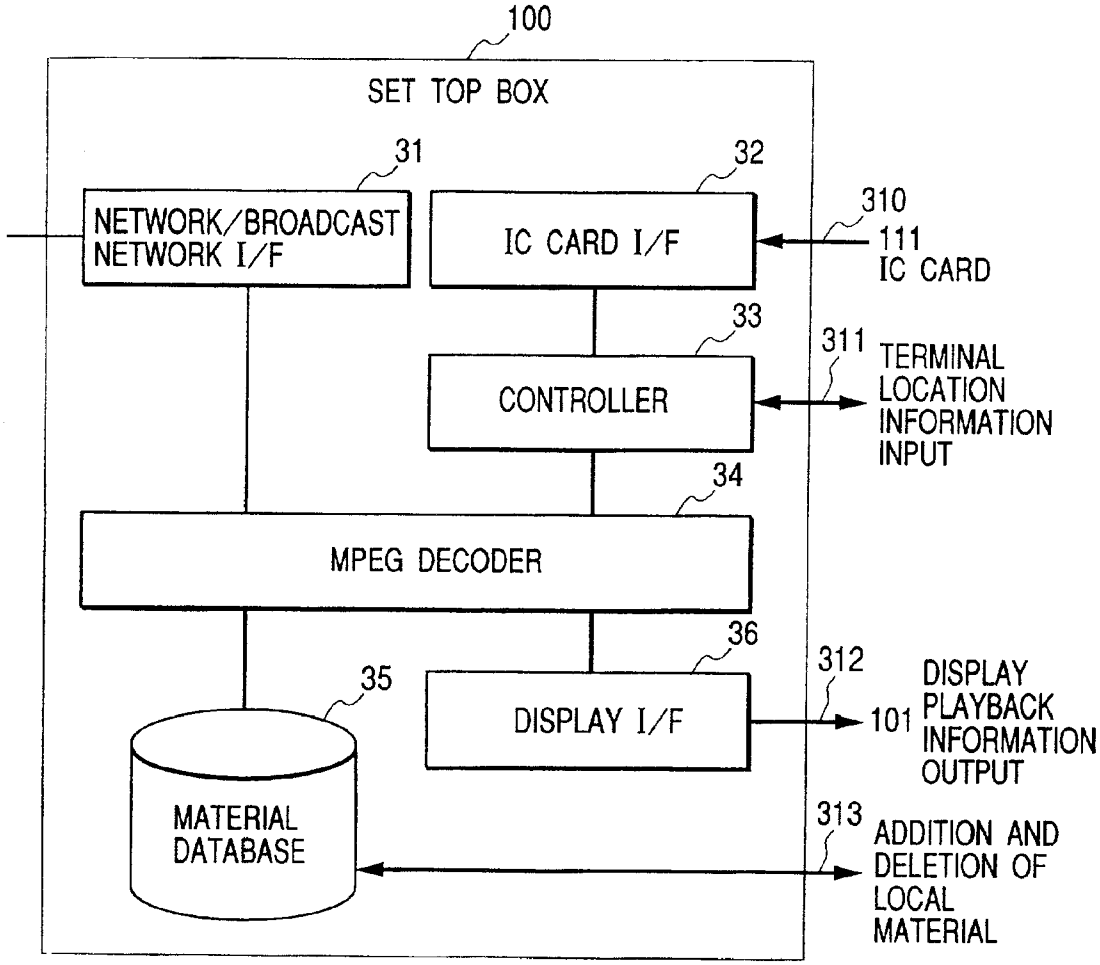
FIG. 17 is a diagram showing a concept of a construction of a set top box in the fourth embodiment.

FIG. 16 shows a functional constructional block diagram of an information contents server 20 of the information delivery center 14C. FIG. 17 shows a functional constructional block diagram of the set top box 100.

The information contents server 20 comprises: a network/broadcast network interface 21 for controlling a delivery medium; an MPEG encoder 22 for converting contents to be delivered into stream data of the MPEG system and adding identification information indicative of a feature of each information object; and a data manager 23 for synthesizing an information material stored in a material database 24 in accordance with program construction information stored in a method database 25 and forming a delivery program.

The set top box 100 comprises: a network/broadcast network interface 31 for controlling a delivery medium; an IC card interface 32 for communicating with the IC card 111 as a user identifying module; a controller 33 for performing various controls by using user profile information 310 of the audience read out from the IC card 111 and terminal location information 311 which is inputted by external input means or the like (not shown) as discrimination parameters; an MPEG decoder 34 for reading out the delivered stream data of the MPEG system, decoding the stream data in response to an instruction of the controller 33, and replacing it into a substitute object; a material database 35 for storing a local material which can be used as a substitute object; and a display interface 36 for converting an output from the MPEG decoder into a signal 312 which can be outputted by the display 101.

A user profile stored in another memory medium such as a portable terminal apparatus or the like can be also used in place of that stored in the IC card. In this case, a portable terminal interface is used in place of the IC card I/F 32.

A local material 313 can be added or deleted to/from the material database 35. The terminal location information 311 is inputted to the controller 33 by external input means such as a keyboard or the like. In another embodiment, the external input means for inputting the terminal location information 311 is a position detection system such as a GPS or the like.

A local material can be added or deleted to/from the material database 35 by a signal from the outside.

Figure 18:
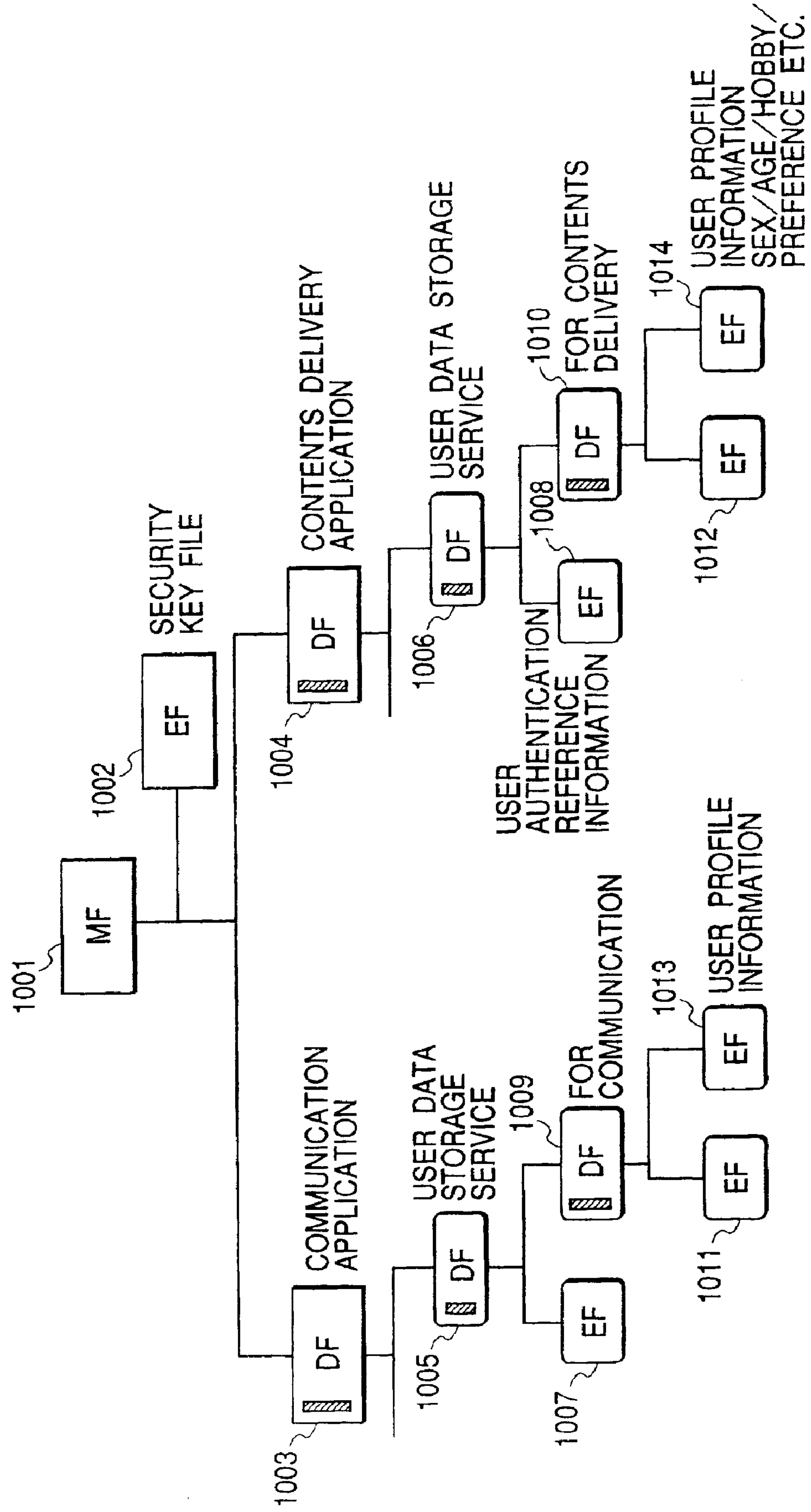
FIG. 18 is a diagram of a logic information storage layer model of an IC card as one of user identifying modules in the fourth embodiment.

FIG. 18 shows a logic layer model of the IC card (in the embodiment, a smart card with a terminal according to ISO7816 is presumed) 111 as a user identifying module in the embodiment. In case of using another memory medium such as a portable terminal apparatus or the like in place of the IC card, this portable terminal apparatus or the like has the logic layer shown in FIG. 18.

Reference numeral 1001 denotes an MF (Master File) as a highest layer of a structure of an IC card logic file.

Reference numeral 1002 denotes a highest EF (Elementary File) as an elementary file for storing information regarding highest DFs (Dedicated Files) 1003 and 1004.

Reference numerals 1003 and 1004 denote the highest DFs existing just under the MF 1001. In the embodiment, a unique value is allocated to an application ID for identifying the highest DF (DF for the service provider) every service provider.

A DF (service application DF) to which the unique application ID is allocated every service menu (communication application, contents delivery application) which is provided by the service provider has been stored under the DFs (1003, 1004).

Among those DFs, various user profile information which is used in the present application has been stored (1007 to 1014) under DFs (1005, 1006) regarding a user data storage service in the embodiment.

The DF 1006 for data storage service of the user who receives the delivery of the contents is provided under the contents delivery application DF 1004. The EF 1008 for storing the information associated with the user authentication for contents delivery and a DF 1010 for contents delivery are provided under the DF 1006. The EF 1012 and the EF 1014 for storing profile information (sex, age, hobby, preference, etc.) of the user who receives the contents delivery are provided under the DF 1010.

The DF 1005 for user data storage service of the communication application is provided under the communication application DF 1003. The EF 1007 and the DF 1009 for communication are provided under the DF 1005. The EF 1011 and the EF 1013 for storing the user profile information for communication are provided under the DF 1009.

Figure 19:
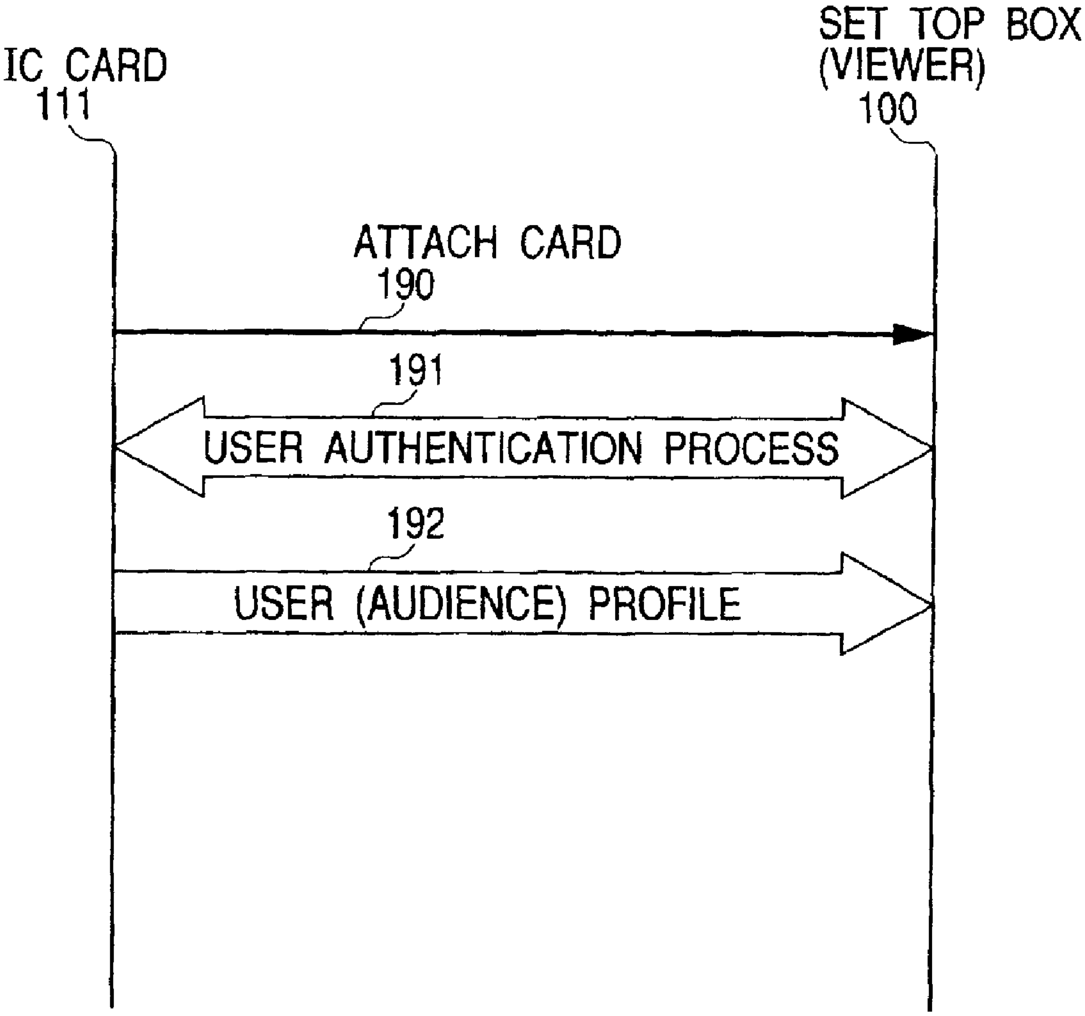
FIG. 19 is a diagram showing a sequence for reading a user profile from the IC card in the fourth embodiment.

FIG. 19 shows a sequence for allowing the controller 33 to retrieve the various user profile information from the IC card. A user profile stored in another memory medium such as a portable terminal apparatus or the like can be also used in place of that stored in the IC card.

After the IC card was attached (190), the controller 33 executes a user authentication process (191) using a password or biometrics and confirms its success. After that, the controller 33 retrieves (192) the user profile from the IC card 111 by using the IC card I/F 32.

In case of executing the contents delivery application, the user profile information is read out from the EF 1014. The information such as sex, age, nationality, hobby, preference, etc. is included in the user profile information. In case of executing the communication application, the user profile information is read out from the EF 1013. The application to be executed is designated from the external input means (not shown).

Therefore, the monitoring of the information contents by an impersonation use of the user identifying module can be prevented.

Figure 21:
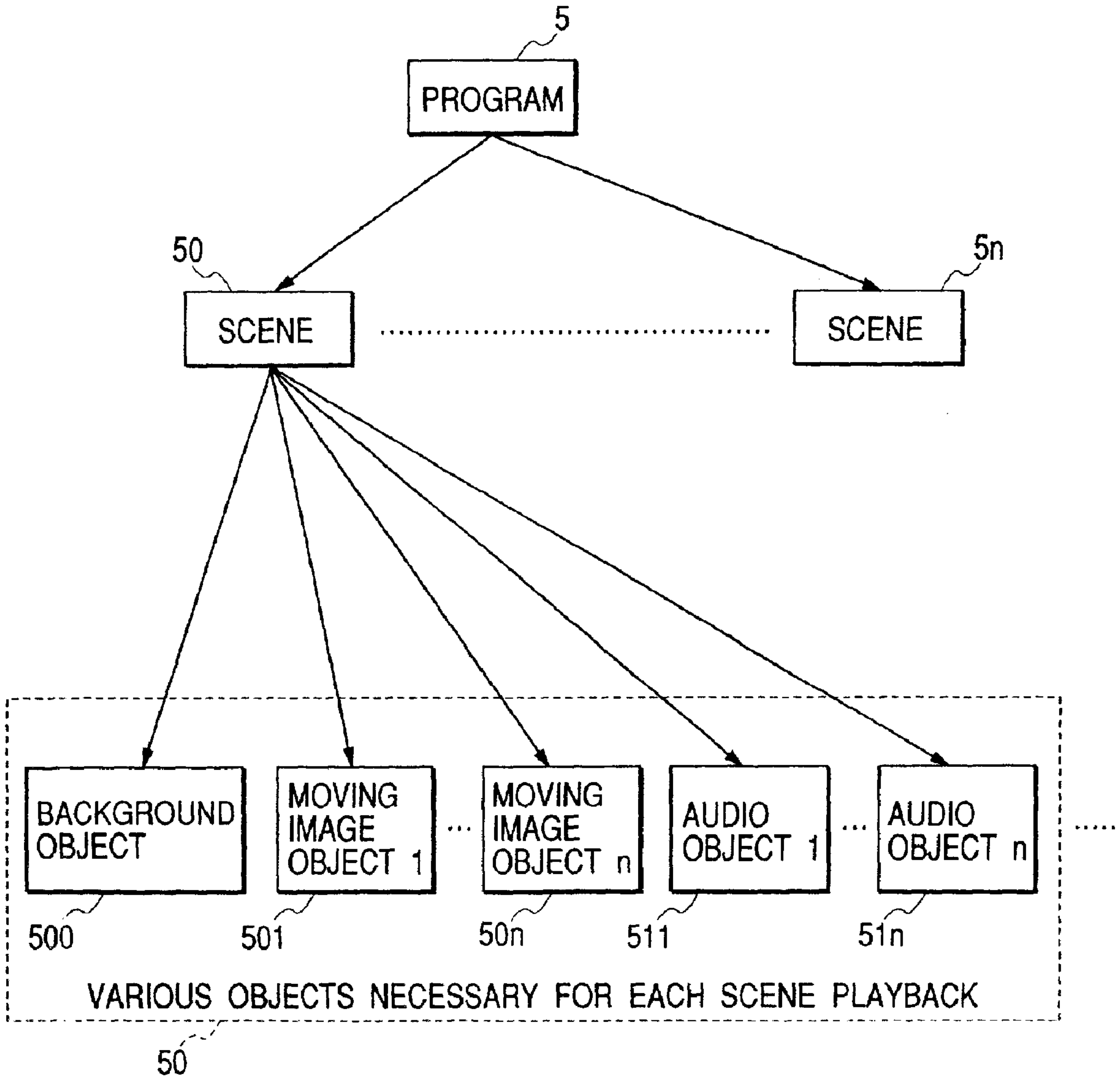
FIG. 21 is a diagram showing a concept of a construction of an object of delivery contents (program) in the fourth embodiment.

FIG. 21 shows a conceptual diagram of a construction of the delivery information contents (program) based on the MPEG system.

Since a program (5) is a moving image, it is constructed by continuous scenes (50 to 5*n*). The scenes are constructed by various objects such as background object 500, moving image objects (501 to 50*n*), audio objects (511 to 51*n*), and the like.

Figure 20:
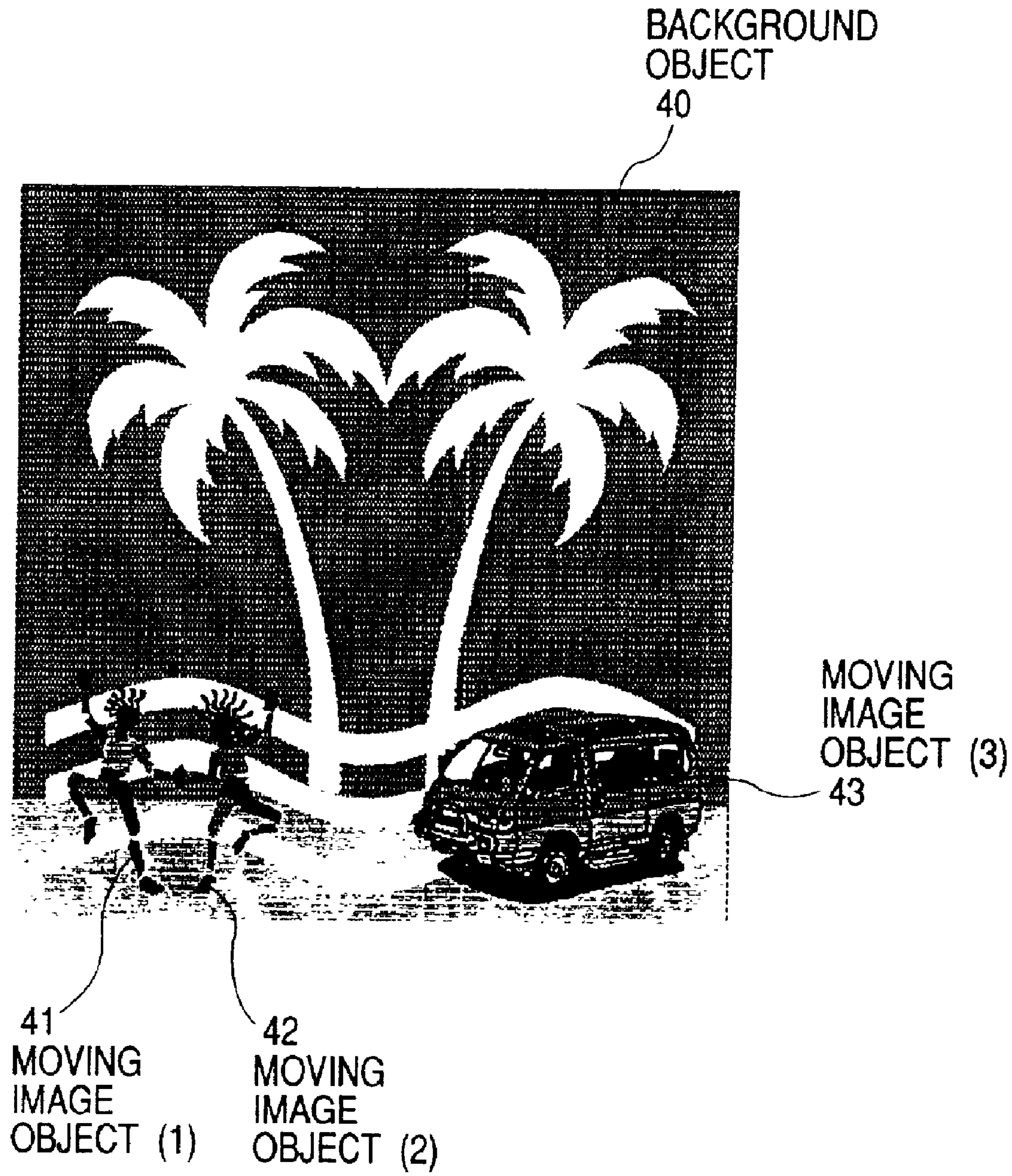
FIG. 20 shows an example of a delivery source image in the fourth embodiment.

In case of delivery one scene as shown in FIG. 20, in the contents server 20, it is divided by the MPEG encoder 22 into four objects comprising: a background object 40 in which a palm tree is drawn as a background; a moving image object 41 of a human being (female) who is dancing on the left side; a moving image object 42 of a human being (male) who is dancing on the right side; and a one-box car 43 which is running.

A user level for monitoring and feature information showing an outline (or feature) of the object are added to each information profile object every object and, thereafter, the object is delivered through the network/broadcast network I/F 31.

Figure 22:
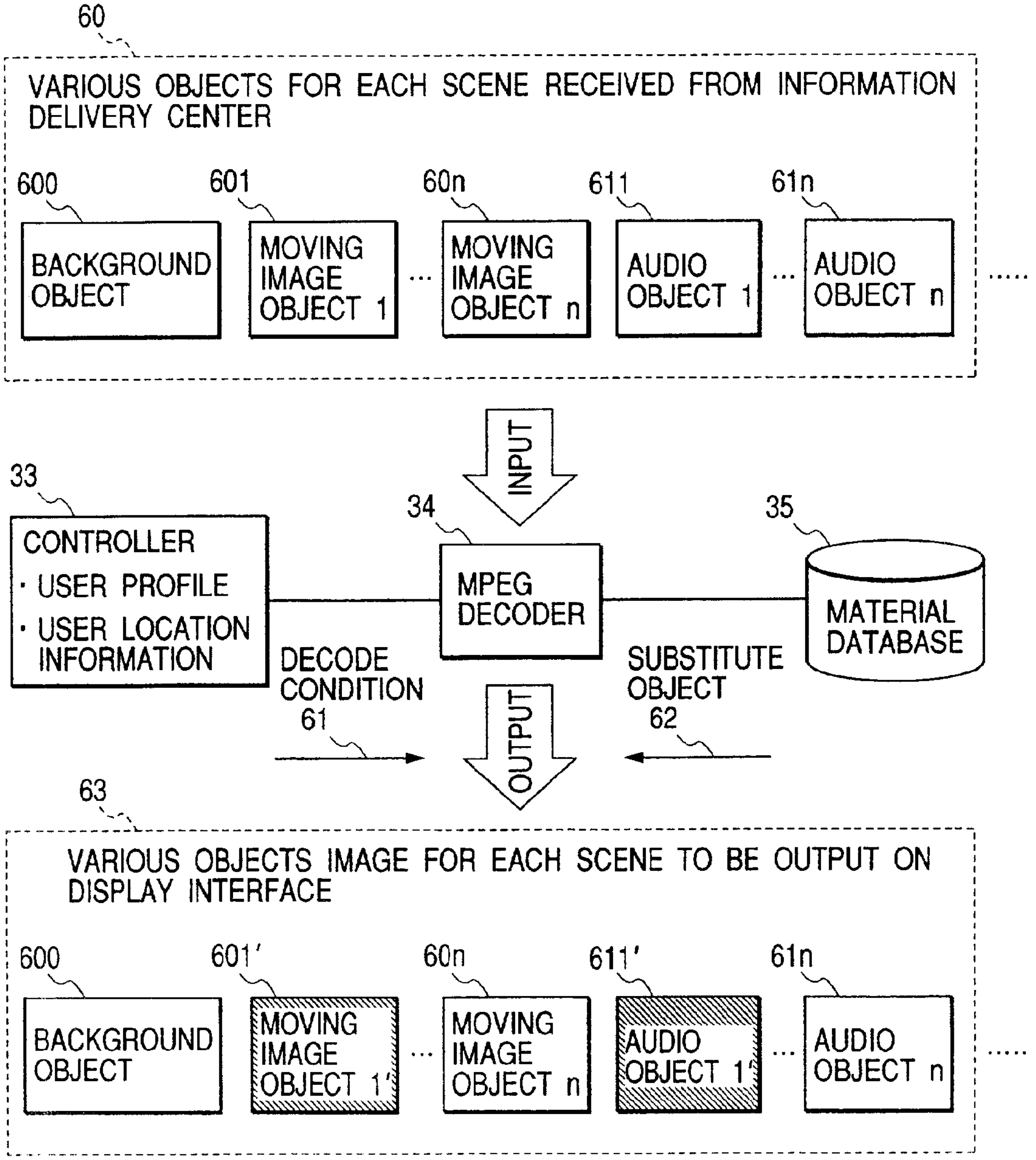
FIG. 22 is a diagram showing a concept of a scene reproducing process of an MPEG decoder on the set top box side in the fourth embodiment.

As shown in FIG. 22, in the set top box 100, the MPEG decoder 34 which received the above delivery through the network/broadcast network I/F 31 selects some of objects (600 to 61*n*) of a received scene 60 in accordance with the feature information added to each of the objects (600 to 61*n*) of the received scene 60, a decode restricting condition 61 based on the profile and monitoring location of the audience received from the controller 33, and the presence or absence of a substitute object 62 in the material database 35, reconstructs a scene suitable for the audience, and reproduces it (63).

The control unit 33 reads the audience profile from the IC card 111. The information of the monitoring location has previously been registered in the controller 33 from the external input means (not shown). In another embodiment, the controller 33 obtains the location information by reading out from the position detection system such as a GPS or the like. The controller 33 determines the decode condition 61 on the basis of the profile of the audience read from the IC card 111 and the monitoring location information inputted from the external input means (not shown). A user profile stored in another memory medium such as a portable terminal apparatus or the like can be also used in place of that stored in the IC card.

The received scene 60 in FIG. 22 is one of the scenes 50 to 5*n* in FIG. 21. Each of the objects (600 to 61*n*) includes the profile object to which the feature information has been added.

Figure 23:
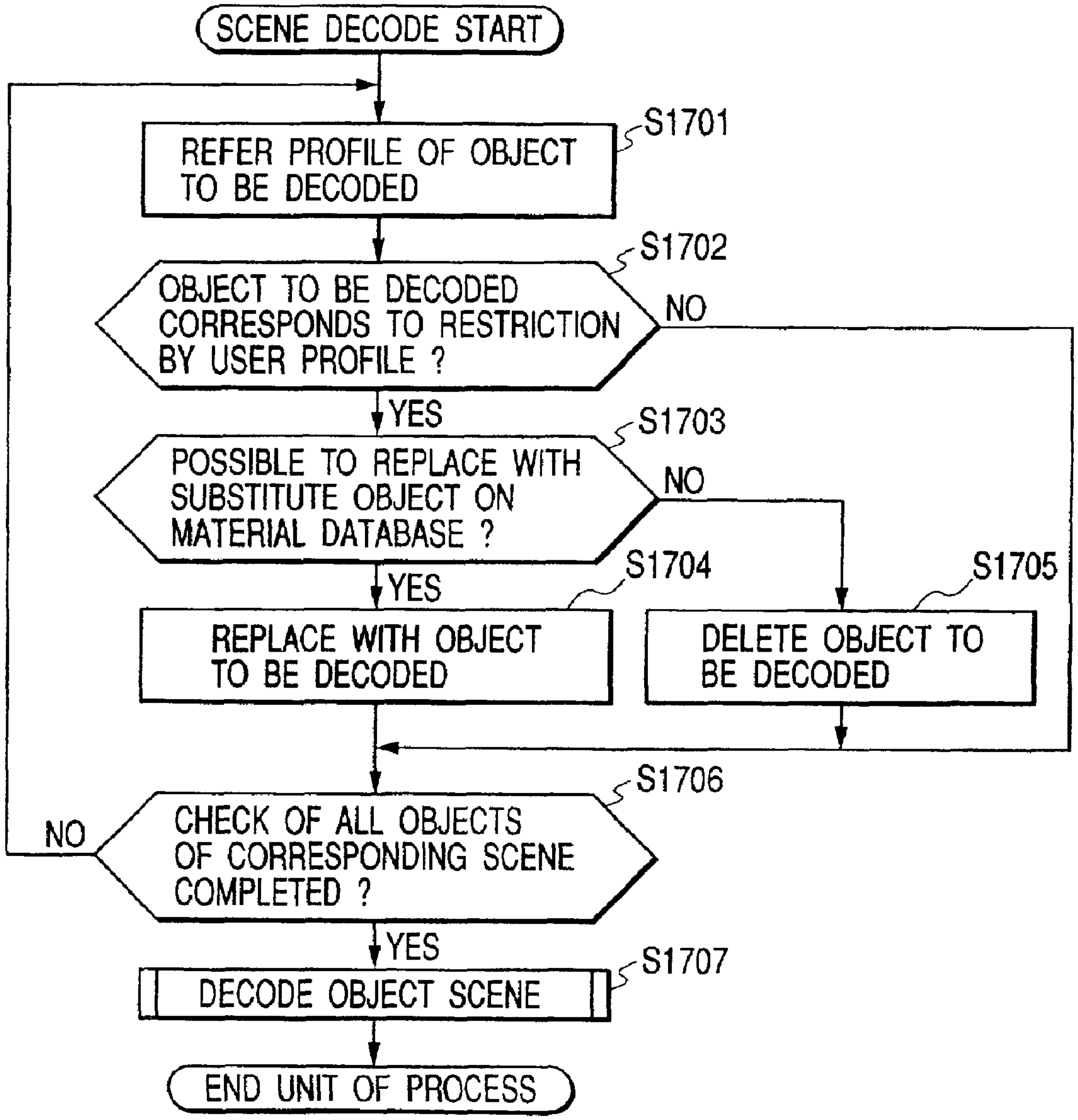
FIG. 23 is a flowchart for discriminating an object to be reproduced by the MPEG decoder upon scene decoding in the fourth embodiment.

FIG. 23 shows a flowchart for a concept of the decoding process of each scene in the MPEG decoder 34 at this time.

First, the MPEG decoder 34 receives the data stream of the scenes (50 to 5*n* in FIG. 21), refers to the profiles of the objects to be decoded (600 to 61*n* in FIG. 22) of each scene (50 in FIG. 21, 60 in FIG. 22) (S1701), and discriminates (S1702) whether it corresponds to the decode restriction condition 61 based on the profile and monitoring location of the audience or not in accordance with the feature information of the target object included in the profile.

If it does not correspond in the discrimination in S1702, the MPEG decoder 34 determines that the corresponding object is used for playback, and whether the corresponding object is the last one of the objects constructing the scene or not is discriminated (S1706).

If it corresponds to the condition 61 in the discrimination in S1702, the MPEG decoder 34 discriminates whether it is possible to replace with the substitute object on the material database 35 in the viewer or not (S1703). If possible, the object to be displayed is replaced with the substitute object (S1704). That is, in the discrimination in S1703, if the substitute object having the corresponding feature information has been stored in the material database 35 in accordance with the feature information corresponding to the decode restriction condition 61, the object corresponding to the restriction condition 61 is replaced with the substitute object in S1704.

If it is impossible to replace in the discrimination in S1703, the MPEG decoder 34 deletes the corresponding object from the objects to be decoded (S1705). After completion of the processes in S1704 and S1705, whether the object to be discriminated at present is the last one of the objects constructing the scene or not is discriminated (S1706).

If it is not the last object, the processing routine is returned to the step of referring to the profile of the objects to be decoded (S1701) for the next scene constructing object. If it is the last object, the target scene is decoded (S1707). The decoding process of one scene is started and the playback of the scene is performed. As mentioned above, the MPEG decoder reconstructs one scene of a moving image in accordance with the user profile.

In the embodiment in which the MPEG decoder 34 is constructed by including the microcomputer which operates in accordance with the program and the memory in which the program has been stored, the flowchart of FIG. 23 shows a part of the program. In this embodiment, the memory corresponds to the memory medium in which the program has been stored so that it can be read out by the computer. The microcomputer reads out the program from the memory and executes the foregoing operation. In the embodiment, in the description of the flowchart, it is assumed that "microcomputer" is substituted for "MPEG decoder".

Figure 24:
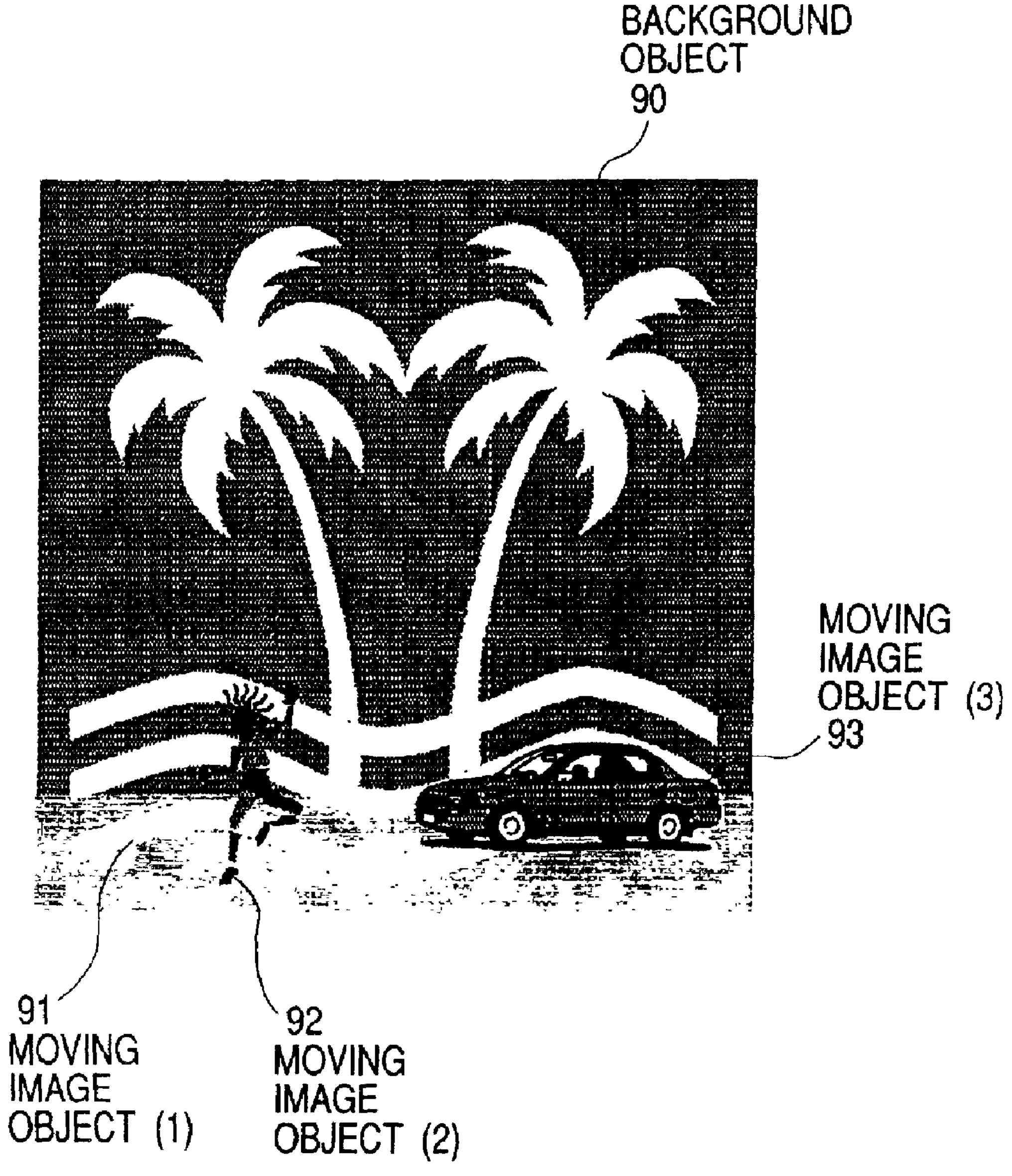
FIG. 24 shows an example of a reproduction of a delivery image in the fourth embodiment.

FIG. 24 shows an example in the case where the original image of FIG. 20 is delivered and reproduced when a playback restriction condition by a user profile inputted from the IC card 111 is "display of a female with the exposed skin is inhibited" (automatic recognition based on a nationality condition or the like) and a playback restriction condition by a viewer setting location information inputted from the IC card 111 is "display of vehicles other than the vehicle made in A country is inhibited" (legal condition or the like of the nation where the viewer is set).

Feature information showing "female, with the exposed skin" is included in the profile of the object 41 in FIG. 20 and information showing "vehicle, made in B country" is included in the profile of the object 43. "vehicle made in A country" is included in the substitute object stored in the material database 35.

A condition that the female with the exposed skin and the vehicles other than the vehicle made in A country are not displayed is included in the decode condition 61.

The controller 33 determines the playback restriction on the basis of the user profile inputted from the IC card 111 and the viewer setting location information inputted from the external input means (not shown). The display restriction of every nationality of the user has been registered in the controller 33. Information indicative of the permission or inhibition of the display of the female with the exposed skin is included in the display restriction of every nationality of the user. The controller 33 determines whether the female with the exposed skin is displayed or not on the basis of the nationality included in the user profile. A condition that the female with the exposed skin is not displayed can be also registered in the user profile of the IC card 111.

Similarly, a display restriction of each terminal location has been registered in the controller 33. Information indicative of the permission or inhibition of a display of the automobiles manufactured in countries other than the self country is included in the display restriction of the terminal location.

Thus, the background object (90) and the male (92) who is dancing on the right side are played back by original images as they are. The female (91) who is dancing on the left side is played back without being displayed on the basis of the restrict condition that her skin is exposed. The one-box car which is running is not displayed because it is not the car made in A country but is changed to a substitute object existing in the viewer (running vehicle made in A country) (93) and played back.

By the above processes, even if the information delivery center is performing the uniform information contents delivery, since the information playback according to the preference and level of the user can be performed by the processes on the terminal side, a load of the processes of the data server on the information delivery center side is reduced. Since the information of the preference and level of the user is not transmitted to the outside of the terminal, a risk of leakage of the personal information of the audience can be reduced.

The storing means such as a database or the like for locally storing the display object material is held in the terminal. When it is determined that the playback of the display object is impossible, in place of the display object, the display object material stored in the storing means such as a database or the like is used as a substitute object and the scene is played back. Therefore, the information scene based on the preference and feature of the user can be reproduced.

The scene can be also reconstructed by the user level (payment fee level or the like) of the audience which was read out from the IC card 111.

Figure 25:
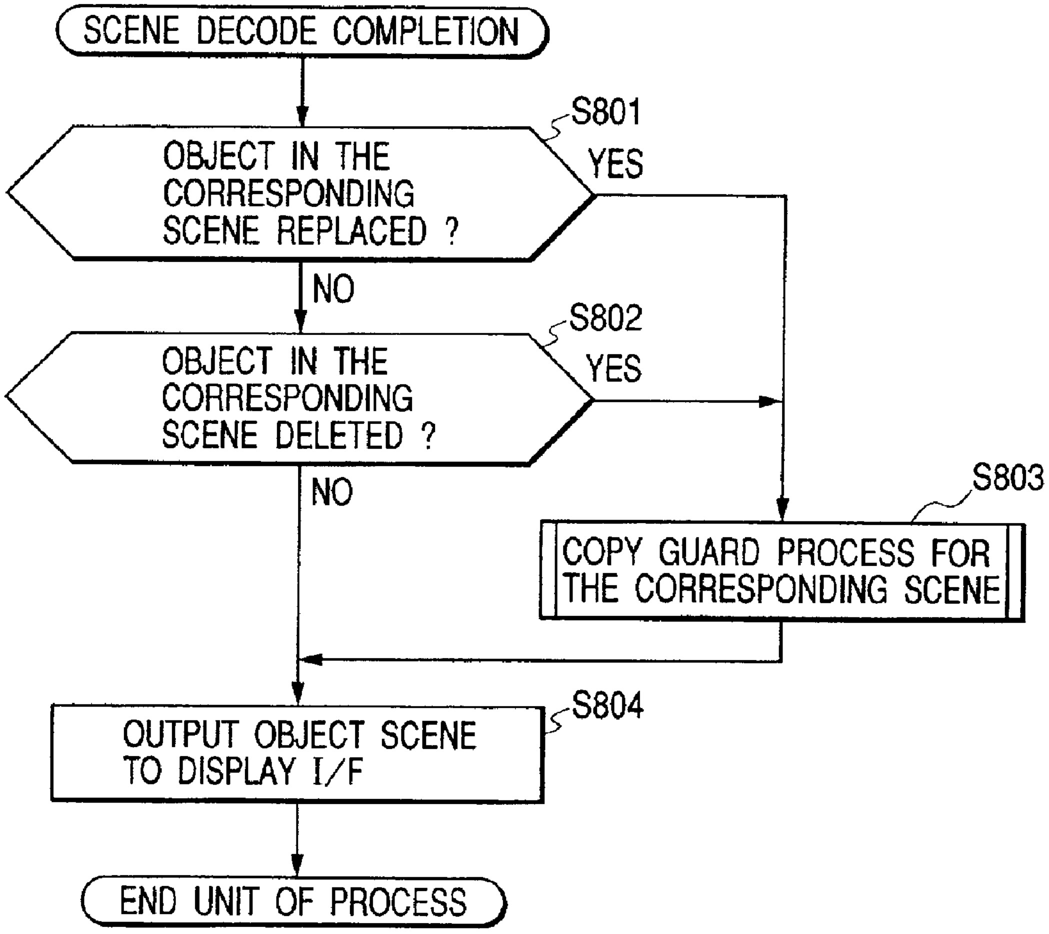
FIG. 25 is a flowchart for discriminating an addition of a copy guard upon completion of the scene decoding in the fourth embodiment.

FIG. 25 shows a conceptual diagram of a processing flow in the embodiment in which a copy guard process is executed when a playback scene is transmitted from the MPEG decoder 34 to the display I/F 36.

First, the MPEG decoder 34 discriminates whether the playback object has been replaced on the playback scene or not (step S801) or deleted or not (step S802).

If NO in both steps, step S804 follows. If either the replacing process or deleting processes is executed, the MPEG decoder 34 executes a copy guard process to the corresponding scene (step S803) and sends the resultant scene to the display I/F 36. In the copy guard process, a copy guard signal is superimposed to an output to the display I/F 36.

Thus, a secondary use of the playback image which is not desired by the contents copyrighter can be prevented.

In the embodiment in which the MPEG decoder 34 is constructed so as to include the microcomputer which operates in accordance with the program and the memory in which the program has been stored, the flowchart of FIG. 25 shows a part of the program. In this embodiment, the memory corresponds to the memory medium in which the program has been stored so that it can be read out by the computer. The microcomputer reads out the program from the memory and executes the foregoing operation. In the embodiment, in the description of the flowchart, it is assumed that "microcomputer" is substituted for "MPEG decoder".

In the above description, as an information transmission system in which the information for identifying the feature of the display object can be added every display object, an embodiment such that the playback moving image is customized by the user on the audience side in accordance with the profile of the broadcast audience in the delivery system of the moving image contents of the broadcast type using the MPEG system is shown.

As a system other than the MPEG system, the playback information display can be customized by the correspondence only on the playback side by a similar system so long as it is an information transmission system in which the information for identifying the feature of the display object can be added every display object.

Although the IC card has been used as a user information identifying module in the embodiments, a similar effect can be obtained even if a portable information terminal such as cellular phone, PDA, or the like is used. Further, the user information identifying module can be also built as one function module into the terminal (viewer 12).

According to further another embodiment, various commercial information is stored into the material database 35 as storing means for storing the display object material of the terminal (viewer 12) and commercial contents are reproduced by using the information such as profile 300, monitoring location 301, or the like of the audience as selection reference. In this embodiment, the commercial contents can be effectively reproduced in accordance with the audience.

What is claimed is:

1. A control method comprising the steps of:

reading out a user profile; and controlling a reconstruction of contents which are displayed on a display for displaying reception data, wherein in said controlling step, contents selected from a plurality of display contents are reconstructed in accordance with the user profile.

2. A method according to claim 1, wherein in said reading step, the user profile is read out from a connected memory medium.

3. A method according to claim 1, wherein in said controlling step, a screen for user authentication is reconstructed in accordance with the user profile.

4. A method according to claim 1, wherein in said reading step, the user profile for user authentication is read out from a second file in a first file in which an application for the user authentication has been stored, and a key for accessing to a fourth file in which another application has been stored is read out from a third file which is accessible after succeeding in said user authentication.

5. A method according to claim 1, wherein in said controlling step, a screen is reconstructed by a language according to the user profile.

6. A method according to claim 1, wherein in said controlling step, the contents according to the user profile are downloaded to a display terminal through a network.

7. A method according to claim 1, wherein in said controlling step, when there is no user profile, predetermined contents are reconstructed.

8. A method according to claim 1, wherein in said controlling step, contents are reconstructed in accordance with display contents described by a text markup language and the user profile.

9. A method according to claim 1, wherein in said controlling step, a display is controlled in accordance with the user profile for every object constructing one scene.

10. A method according to claim 1, wherein in said controlling step, an object is replaced with a substitute object in accordance with the user profile for every object constructing one scene.

11. A method according to claim 1, wherein in said controlling step, a copy guard process of the display contents is executed when the reception data and the display contents are different.

12. A control apparatus comprising:

reading means for reading out a user profile; and control means for controlling a reconstruction of contents which are displayed on a display for displaying reception data, wherein said control means reconstructs contents selected from a plurality of display contents in accordance with the user profile.

13. An apparatus according to claim 12, wherein said reading means recognizes the user profile from a connected memory medium.

14. An apparatus according to claim 12, wherein said control means reconstructs a screen for user authentication in accordance with the user profile.

15. An apparatus according to claim 12, wherein said reading means reads out the user profile from a memory medium comprising:

a first file in which an application for user authentication has been stored;

a second file for storing the user profile for the user authentication;

a third file which is accessible after succeeding in said user authentication; and a fourth file for storing another application, and wherein a key for accessing said fourth file is stored in said third file.

16. An apparatus according to claim 12, wherein said control means reconstructs a screen by a language according to the user profile.

17. An apparatus according to claim 12, wherein said control means downloads the contents according to the user profile to a display terminal through a network.

18. An apparatus according to claim 12, wherein said control means reconstructs predetermined contents when there is no user profile.

19. An apparatus according to claim 12, said control means reconstructs contents in accordance with display contents described by a text markup language and the user profile.

20. An apparatus according to claim 12, wherein said control means controls a display in accordance with the user profile for every object constructing one scene.

21. An apparatus according to claim 12, wherein said control means replaces an object with a substitute object in accordance with the user profile for every object constructing one scene.

22. An apparatus according to claim 12, wherein said control means executes a copy guard process of the display contents when the reception data and the display contents are different.

23. An program comprising the steps of:

detecting a user profile; and controlling a reconstruction of contents which are displayed on a display for displaying reception data, wherein in said controlling step, the contents selected from a plurality of display contents are reconstructed in accordance with the user profile.

24. A program according to claim 23, wherein in said detecting step, the user profile is read out from a connected memory medium.

25. A program according to claim 23, wherein in said controlling step, a screen for user authentication is reconstructed in accordance with the user profile.

26. A program according to claim 23, wherein in said detecting step, the user profile for user authentication is read out from a second file in a first file in which an application has been stored, and a key for accessing a fourth file in which another application has been stored is read out from a third file which is accessible after succeeding in said user authentication.

27. A program according to claim 23, wherein in said controlling step, a screen is reconstructed by a language according to the user profile.

28. A program according to claim 23, wherein in said controlling step, the contents according to the user profile are downloaded to a display terminal through a network.

29. A program according to claim 23, wherein in said controlling step, when there is no user profile, predetermined contents are reconstructed.

30. A program according to claim 23, wherein in said controlling step, contents are reconstructed in accordance with display contents described by a text markup language and the user profile.

31. A program according to claim 23, wherein in said controlling step, a display is controlled in accordance with the user profile for every object constructing one scene.

32. A program according to claim 23, wherein in said controlling step, an object is replaced with a substitute object in accordance with the user profile for every object constructing one scene.

33. A program according to claim 23, wherein in said controlling step, a copy guard process of the display contents is executed when the reception data and display contents are different.

34. A control apparatus comprising:

detecting means for detecting a user profile from a memory medium; and control means for controlling a reconstruction of contents which are displayed on a display for displaying reception data in accordance with a user profile.

35. An apparatus according to claim 34, wherein said control means controls a user authentication screen which is displayed on said display for displaying the reception data.

36. An apparatus according to claim 35, wherein said control means selects data input means for the user authentication in accordance with the user profile.

37. An apparatus according to claim 35, wherein said control means selects data output means for the user authentication in accordance with the user profile.

38. A control method comprising the steps of:

reading out a user profile for user authentication from a second file in a first file in which an application for the user authentication has been stored;

reading out a key for accessing a fourth file in which another application has been stored from a third file which is accessible after succeeding in said user authentication; and controlling a reconstruction of contents which are displayed on a display for displaying reception data in accordance with the user profile.

39. A control apparatus comprising:

reading means for (i) reading out a user profile from a memory medium storing: (a) a first file in which an application for user authentication has been stored, (b) a second file for storing the user profile for the user authentication, (c) a third file which is accessible after succeeding in said user authentication, and (d) a fourth file for storing another application, and (ii) reading out a key for accessing said fourth file, which key is stored in said third file; and control means for controlling a reconstruction of contents which are displayed on a display for displaying reception data in accordance with the user profile.

40. A program comprising the steps of:

reading out a user profile for user authentication from a second file in a first file in which an application for the user authentication has been stored;

reading out a key for accessing a fourth file in which another application has been stored from a third file which is accessible after succeeding in said user authentication; and controlling a reconstruction of contents which are displayed on a display for displaying reception data in accordance with the user profile.

* * * * *

UNITED STATES PATENT AND TRADEMARK OFFICE

CERTIFICATE OF CORRECTION

PATENT NO. : 6,944,766 B2 
DATED : September 13, 2005
INVENTOR(S) : Masashi Hamada It is certified that error appears in the above-identified patent and that said Letters Patent is hereby corrected as shown below:

Drawings,
Sheet 14, FIG. 14, “AN USER” should read -- A USER --.

Column 4,
Line 33, “an medical” should read -- a medical --.

Column 17,
Lines 7 and 18, “added” should read -- added to --.

Column 18,
Line 23, “An program” should read -- A program --.

Signed and Sealed this

Thirtieth Day of May, 2006

JON W. DUDAS
*Director of the United States Patent and Trademark Office*